United States Patent
Browne et al.

(10) Patent No.: US 7,686,120 B2
(45) Date of Patent: Mar. 30, 2010

(54) HOOD LIFT MECHANISMS UTILIZING ACTIVE MATERIALS AND METHODS OF USE

(75) Inventors: Alan L. Browne, Grosse Pointe, MI (US); Nancy L. Johnson, Northville, MI (US); Kenneth A. Strom, Washington, MI (US); Diann Brei, Milford, MI (US); Jonathan E. Luntz, Ann Arbor, MI (US); John Redmond, Ann Arbor, MI (US); Brian M. Barnes, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 611 days.

(21) Appl. No.: 11/533,430

(22) Filed: Sep. 20, 2006

(65) Prior Publication Data

US 2007/0063540 A1 Mar. 22, 2007

Related U.S. Application Data

(63) Continuation-in-part of application No. 11/430,794, filed on May 9, 2006, now Pat. No. 7,455,147, and a continuation-in-part of application No. 10/864,724, filed on Jun. 9, 2004, now Pat. No. 7,392,876.

(51) Int. Cl.
  *B60R 21/34* (2006.01)
  *B62D 25/12* (2006.01)
(52) U.S. Cl. .................... 180/274; 180/69.21
(58) Field of Classification Search ............... 180/274, 180/69.1, 69.21, 281; *B60R 21/34; B62D 25/12*
See application file for complete search history.

(56) References Cited

U.S. PATENT DOCUMENTS

| | | | |
|---|---|---|---|
| 1,748,371 A | | 2/1930 | Trieschmann |
| 3,842,930 A | * | 10/1974 | Fiala .......................... 280/735 |
| 4,249,632 A | | 2/1981 | Lucchini et al. |
| 4,702,094 A | | 10/1987 | Peterson |
| 4,923,057 A | | 5/1990 | Carlson et al. |
| 5,068,018 A | | 11/1991 | Carlson |
| 5,629,662 A | | 5/1997 | Floyd et al. |
| 5,725,928 A | | 3/1998 | Kenney et al. |
| 5,727,391 A | | 3/1998 | Hayward et al. |
| 5,794,975 A | | 8/1998 | Nohr et al. |
| 5,934,743 A | | 8/1999 | Nohr et al. |

(Continued)

FOREIGN PATENT DOCUMENTS

WO   WO 01/84002 A2   8/2002

*Primary Examiner*—Paul N Dickson
*Assistant Examiner*—Drew Brown

(57) ABSTRACT

A hood lift mechanism for reversibly increasing the energy absorption capability at appropriate force levels of a vehicle hood includes a vehicle hood; an active material in operative communication with the vehicle hood, wherein the active material comprises a shape memory alloy, a ferromagnetic shape memory alloy, a shape memory polymer, a magnetorheological fluid, an electroactive polymer, a magnetorheological elastomer, an electrorheological fluid, a piezoelectric material, an ionic polymer metal composite, or combinations comprising at least one of the foregoing active materials; and an activation device in operative communication with the active material, wherein the activation device is operable to selectively apply an activation signal to the active material and effect a reversible change in a property of the active material, wherein the reversible change results in an increased clearance distance between the vehicle hood and an underlying component.

17 Claims, 15 Drawing Sheets

U.S. PATENT DOCUMENTS

| | | |
|---|---|---|
| 6,086,599 A | 7/2000 | Lee et al. |
| 6,375,251 B1 | 4/2002 | Taghaddos |
| 6,386,623 B1 | 5/2002 | Ryan et al. |
| 6,390,878 B1 | 5/2002 | Zhou et al. |
| 6,415,883 B1 | 7/2002 | Myrholt et al. |
| 6,428,080 B1 | 8/2002 | Ochoa |
| 6,588,525 B2 | 7/2003 | Brogly et al. |
| 6,746,074 B1 | 6/2004 | Kempf et al. |
| 6,786,508 B2 | 9/2004 | Fraley et al. |
| 6,824,202 B2 | 11/2004 | Vismara et al. |
| 6,910,714 B2 | 6/2005 | Browne et al. |
| 6,986,855 B1 | 1/2006 | Hood et al. |
| 7,392,876 B2 * | 7/2008 | Browne et al. ............ 60/528 |
| 2002/0007884 A1 | 1/2002 | Schuster et al. |
| 2002/0033294 A1 * | 3/2002 | Ishizaki et al. ............ 180/274 |
| 2003/0121710 A1 * | 7/2003 | Hamada et al. ............ 446/14 |
| 2004/0078127 A1 | 4/2004 | Johnson et al. |

* cited by examiner

HOOD LIFT MECHANISMS UTILIZING ACTIVE MATERIALS AND METHODS OF USE

CROSS REFERENCE TO RELATED APPLICATIONS

This application is a Continuation-in-Part application of U.S. patent application Ser. No. 11/430,794 filed on May 9, 2006, and U.S. patent application Ser. No. 10/864,724 filed on Jun. 4, 2004, incorporated herein by reference in their entireties.

BACKGROUND

The present disclosure generally relates to a hood lift mechanism for use in an automotive vehicle, wherein the hood lift mechanism includes the use of active materials. Also disclosed is control logic for reversibly and selectively activating the active material based hood lift mechanism.

Numerous motor vehicles employ a hingeable hood disposed in a region between the passenger compartment and the forward bumper of the motor vehicle, or between the passenger compartment and the rearward bumper of the motor vehicle. The hingeable hood provides a mechanism for accessing the underlying engine or storage compartment. The hingeable hood is typically formed of a relatively thin sheet of metal or plastic that is molded to the appropriate contour corresponding to the overall vehicle body design. Owing to the relatively thin nature of the material forming the hingeable hood, a support structure such as a contoured plate with stamped rib supports typically extends across the underside of the hood portion so as to provide a degree of dimensional stability to the structure.

Aerodynamics, styling, and packaging considerations, among others, have all contributed to the design of the front ends and hood regions of current vehicles. Aerodynamic drag (and fuel economy considerations) in particular has contributed to the hood being in close proximity to the engine or storage compartment. Accordingly, hood deformation such as that which may occur upon impact of an object onto the hood, and thus the ability of the hood to absorb energy at appropriate force levels before bottoming out against hard objects beneath it, is somewhat limited by the contents of the compartment.

In response, automobile manufacturers have proposed a number of mechanisms that change the orientation and/or position with respect to the vehicle of the hood before a deformation event such as the impact event previously described. For example, hood lifters may be activated by impact sensors to increase the space between the hood and the underlying compartment. The hood lifters change the orientation of the hood by raising it (in most mechanisms by raising it at a rear edge while maintaining attachment of a front edge to the vehicle structure, i.e., tilting) above the engine compartment. Upon deformation then, because of the increase in clearance there is an increase in the amount of the energy that can be absorbed by deformation of the sheet metal before bottoming out. One drawback to such hood lifting mechanisms is that they tend to be irreversible (which makes them best suited for use only with crash and not with pre-crash sensors), so that such mechanisms will need to be replaced/repaired even if a collision does not in fact occur.

Accordingly, there remains a need in the art for automotive hood components having improved energy absorbing capabilities. The means/mechanisms that produce these energy-absorbing capabilities are desirably reversible as well.

BRIEF SUMMARY

Disclosed herein are dual chamber lifting apparatuses and methods of lifting a hood. In one embodiment, the dual chamber lifting apparatus in combination with a vehicle closure, the dual chamber lifter comprises a closure; and a dual chamber lifter configured to selectively lift and lower the hood, the dual chamber lifter comprising a piston assembly disposed within a sealed housing, the piston assembly comprising a movable shaft and a piston head defining an upper chamber and a lower chamber; at least one pump in fluid communication with a selected one of the upper chamber, the lower chamber, and both the upper and lower chambers; a least one active material based valve in fluid communication with a selected one of the upper chamber, the lower chamber, and both the upper and lower chambers; and a controller for selectively providing an activation signal to the active material, wherein the activation signal is effective to change an attribute of the active material that opens the valve.

A method for selectively lifting a vehicle closure, comprises pressurizing an upper chamber and a lower chamber of a dual chamber lifter, the dual chamber lifter comprising a slidable piston defining the upper and lower chamber; and selectively activating at least one active material valve in fluid communication with a selected one of the upper chamber, the lower chamber or both the upper and lower chambers, wherein activating the active material valve depressurizes the upper chamber causing the piston to rise and raise the vehicle closure.

A computer program product for selectively lifting a vehicle closure and absorbing energy upon an impact event thereto comprises a storage medium readable by a processing circuit and storing instructions for execution by the processing circuit for facilitating a method. The method comprises generating and storing energy in a dual chamber lifter by turning on an ignition of a vehicle, wherein storing energy comprises pressurizing an upper chamber and a lower chamber defined by movable piston within a sealed housing; and sensing a first condition and responsively releasing the vehicle closure and the stored energy to lift the vehicle closure from a first position to a second position, wherein releasing the stored energy comprises depressurizing the upper chamber by activating an active material valve and causing a pressure differential between the upper chamber and a lower chamber defined by a piston, wherein the piston rises and lifts the vehicle closure.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
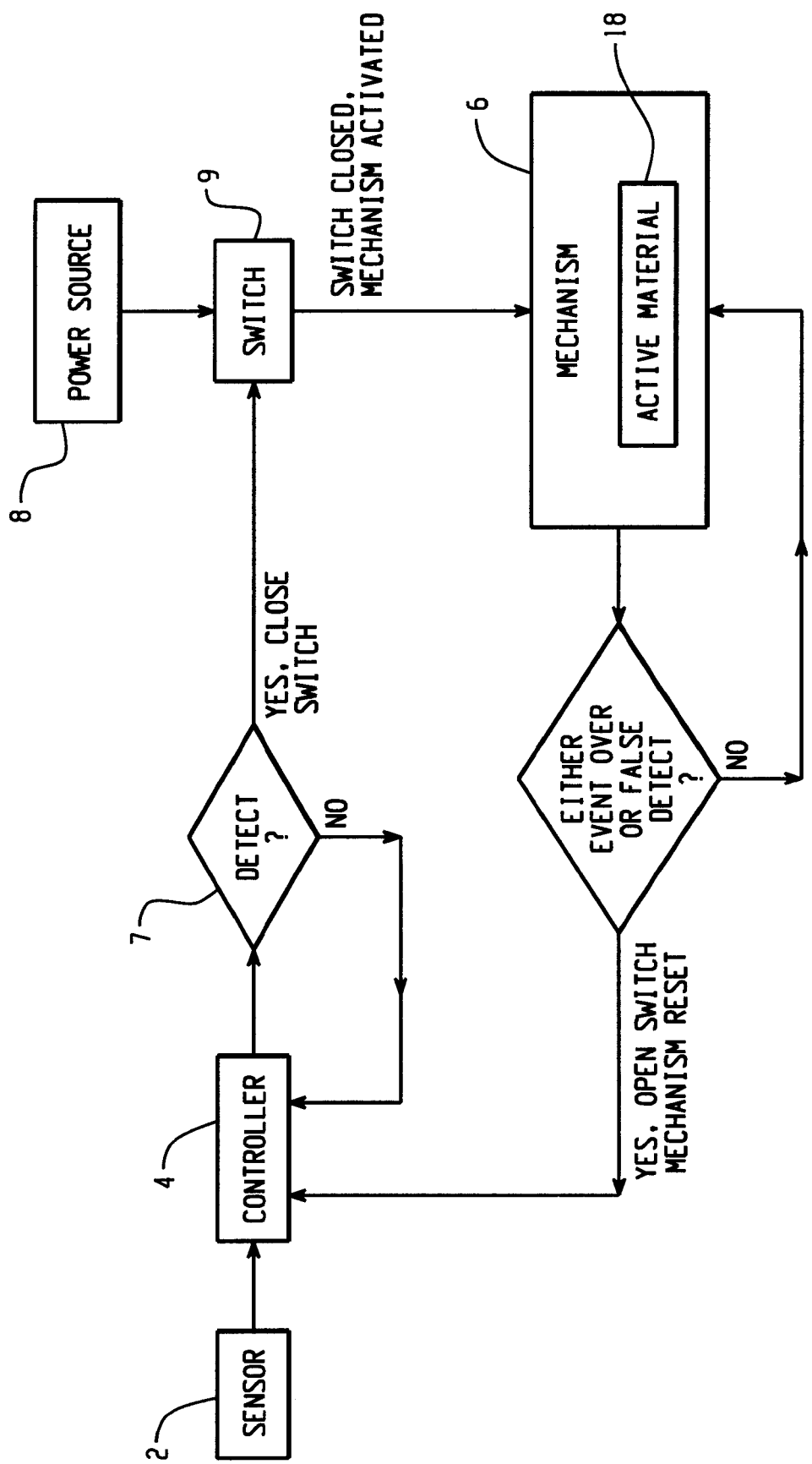
FIG. 1 is a block diagram showing common elements of hood mechanisms.

Methods and hood lift mechanisms for reversibly increasing the energy absorption capability at appropriate force levels of a vehicle hood are disclosed herein. In contrast to the prior art, the methods and lift mechanisms disclosed herein advantageously are based on active materials and provide reversibility. As used herein, the term "hood" is synonymous with "closure" and generally refers to lids covering an engine compartment, or a storage compartment, or fuel tank areas as well as to vehicle doors for passenger entry into and out of the vehicle, lift gates, tail gates, cargo hatches, and the like. In addition, for the purposes of this disclosure, the term hood and/or closure is also meant to include deployable panels such as fenders, bumpers, roofs, and the like. The term "vehicle body" as used herein generally refers to parts of the vehicle onto which the hood may be fastened and includes, among others, bumper support, jams, fender support, chassis, pillars, frame and subframe components, and the like. The term "active material" as used herein generally refers to a material that exhibits a change in a property such as dimension, shape, shear force, or flexural modulus upon application of an activation signal. Suitable active materials include, without limitation, shape memory alloys (SMA), ferromagnetic SMAs, shape memory polymers (SMP), piezoelectric materials, electroactive polymers (EAP), magnetorheological fluids and elastomers (MR), and electrorheological fluids (ER). Depending on the particular active material, the activation signal can take the form of, without limitation, an electric current, a temperature change, a magnetic field, a mechanical loading or stressing, or the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

In one embodiment, a method for reversible and on-demand increase of energy absorption capabilities of a hood generally comprises producing an activation signal with an activation device, applying the activation signal to the active material, and increasing a clearance distance between the hood and an underlying component. Producing the activation signal may comprise sensing an impact event, sensing the imminence of an impact event, manual activation by an occupant, electronic activation through a built-in logic control system based on inputs, such as for example, activation of a vehicle stability enhancement system (VSES), turning on or off the ignition, anti-lock brake activation, and the like.

In another embodiment, the hood lift mechanism generally comprises an activation device, and the active material in operative communication with the hood, wherein the active material undergoes a property change resulting in an increased clearance distance between the hood and the underlying component.

The activation device is operable to selectively apply the activation signal to the active material. The activation signal provided by the activation device may include a heat signal, a magnetic signal, an electrical signal, a pneumatic signal, a mechanical signal, and the like, and combinations comprising at least one of the foregoing signals, with the particular activation signal dependent on the materials and/or configuration of the active material. For example, a magnetic and/or an electrical signal may be applied for changing the property of the active material fabricated from magnetostrictive materials. A heat signal may be applied for changing the property of the active material fabricated from shape memory alloys and/or shape memory polymers. An electrical signal may be applied for changing the property of the active material fabricated from electroactive materials, piezoelectrics, electrostatics, and/or ionic polymer metal composite materials.

Desirably, for direct actuation mechanisms the change in the property of the active material remains for the duration of the applied activation signal. Also desirably, upon discontinuation of the activation signal, the property reverts substantially to its original form prior to the change. In this manner, reversibility can advantageously occur.

Depending on the particular hood lift mechanism chosen, the active material may provide increased clearance distance through a change in a hood shape (i.e., geometry), a hood location, a hood orientation, or a combination comprising at least one of the foregoing changes. Prior to the active material providing the increased clearance distance, the hood is said to be in a so-called "rest position". When the active material has provided the increased clearance distance, the hood is said to be in a "lift position" or "lifted position". The hood may change from the rest position to the lift position through active and/or passive means as will be described in greater detail below.

In some embodiments, the hood may change from the rest position to the lift position through an active hood lift mechanism. Active hood lift mechanisms include direct, composite, and indirect active hood lift mechanisms.

With direct mechanisms, the active material directly acts on the hood to provide the increased clearance distance. Suitable direct active hood lift mechanisms include linear rod mechanisms, torsional rod mechanisms, buckling wire mechanisms, and the like.

The active material, in operative communication with the hood, increases the energy absorbing capabilities by changing the hood shape, changing the hood stiffness, changing the stiffness of the mounting hardware, and/or changing the hood orientation through active lifting and/or active tilting means to provide increased clearance from underlying engine compartment. The resulting deformation behavior including stiffness and modulus properties can be altered either globally or locally.

In one embodiment, the active material changes the shape or orientation of a vehicle hood in response to an activation signal. A device or actuator contains the active material, wherein the active material has a first shape, dimension, or stiffness and is operative to change to a second shape, dimension, stiffness, and/or provide a change in shear strength in response to the activation signal. The device is designed to be installed in operative communication with the hood.

In another embodiment, a vehicle system contains an impact sensor that generates an impact signal. The system further contains a controller disposed to receive the impact signal and a hood impact mitigation device that operates upon receiving the activation signal from the controller. The active material changes its shape, stiffness or other physical property in response to the activation signal. The mitigation device, for example, may be a hood lifter.

In various embodiments, the response of the mitigation device to the signal may be reversible (to prevent damage in the event that an impact does not occur) and/or may be tailored both locally and globally to the particular nature of the impact event. It may also, for example, in the case of stiffness changes, be unnoticeable or undetectable (fully reversible), unless an impact occurs, to the vehicle operator. Further, there is minimal interference with vehicle operation. Common elements to the various embodiments described herein are illustrated in FIG. 1. Such elements include a sensor 2 plus a controller 4 for triggering the active material based mechanism 6. It further contains a power source 8, a switch 9, and one or more active materials 18 incorporated into the mechanism 6. In a preferred mode of operation, the mechanism is unpowered during normal driving and is activated or powered when triggered by detection of an output signal 7 from the controller 4 based on input to it from an impact or pre-impact sensor, schematically illustrated by 2 in FIG. 1. Such a mechanism would remain activated through the impact event and deactivated upon the conclusion of the impact event. In an alternative embodiment, the mechanism would be deactivated upon a timer timing out, which would be useful in the case of a false detect.

Figure 2:
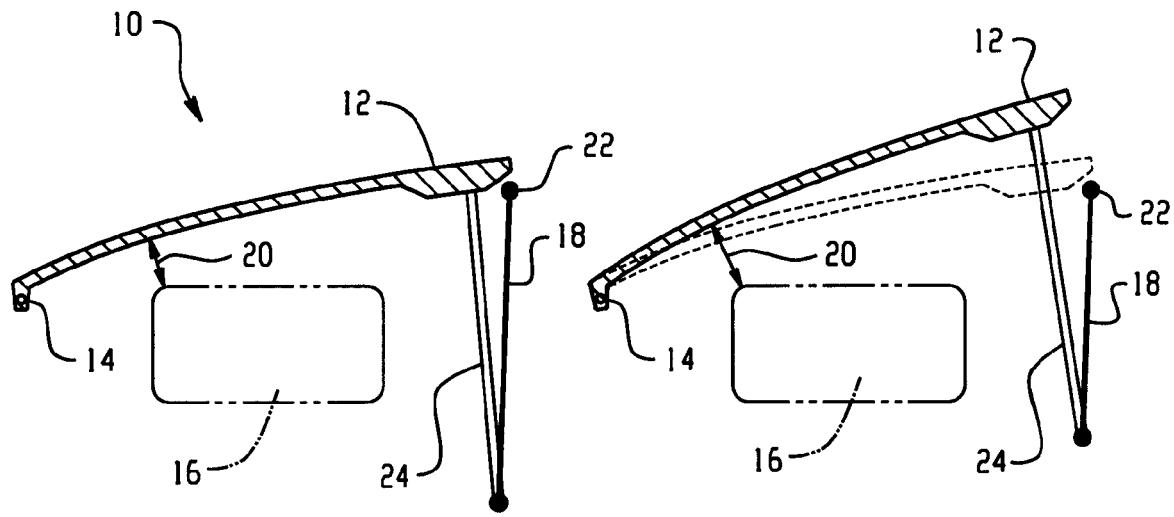
FIG. 2 is a schematic representation of a cross-section of a linear rod active hood lift mechanism in rest and lift positions.

For example, FIG. 2 depicts an exemplary linear rod active hood lift mechanism 10 in the rest and lift positions. The hood 12 comprises a rotating pivot point 14 at one end. Pivot point 14 provides a means of attachment for hood 12 to a vehicle body (not shown). A lifting rod 24 is disposed on hood 12 on an end opposite to pivot point 14. An active material 18 is disposed on lifting rod 24. Connector 22 is coupled to and in operative communication with active material 18 on an end opposite to lifting rod 24. Connector 22 provides a means of attachment for active material 18 to an activation device (not shown), which is at a fixed location. A clearance distance 20 is defined as a distance between hood 12 and an under hood rigid body component 16, e.g., an engine. In the rest position, clearance distance 20 is at a minimum.

Producing the activation signal with the activation device (not shown) and applying the activation signal to active material 18 effects a change in at least one property of active material 18. When the change in the at least one property is effected, active material 18 exerts a linear pulling force on lifting rod 24, which results in an increased clearance distance 20 owing to a change in the hood location. Under these circumstances, hood 12 is no longer in the rest position, but in the lift position. For example, if the active material is a shape memory alloy or polymer, the activation signal may comprise a thermal signal, which causes contraction of the shape memory alloy or polymer, resulting in a change in hood location.

Alternatively, multiple lifting rods may be used in parallel to enable both a change in hood location and orientation.

In another embodiment, lifting rod 24 may substitute for active material 18 and is formed from an active material. Alternatively, lifting rod 24 may comprise an active material, which optionally is the same active material used in active material 18.

Figure 3:
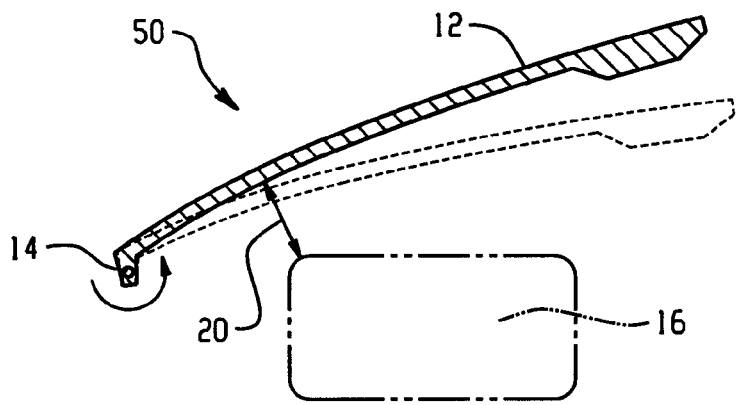
FIG. 3 is a schematic representation of a cross-section of a torsional rod active hood lift mechanism in rest and lift positions.

FIG. 3 depicts an exemplary torsional rod active hood lift mechanism 50 in the rest and lift positions. The hood 12 comprises a rotating pivot point 14 at one end. Pivot point 14 provides a means of attachment for hood 12 to a vehicle body (not shown). The rotation of pivot point 14 is controlled by a torsional rod (not shown). The torsional rod is coupled to and in operative communication with the active material (not shown). In the rest position, shown in FIG. 2 as dashed hood 12, clearance distance 20 is at a minimum.

Producing the activation signal with the activation device (not shown) and applying the activation signal to the active material effects a change in the property of the active material. When the change in the property is effected, the active material exerts a rotational force on the torsional rod, which results in an increased clearance distance 20, owing to a change in the hood location. Under these circumstances, hood 12 is no longer in the rest position, but in the lift position, shown in FIG. 2 as shaded hood 12. Optionally, the torsional rod is formed of the active material.

Figure 4:
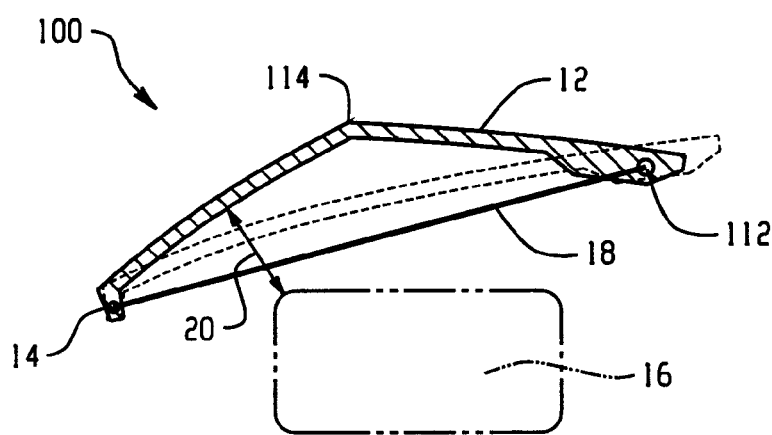
FIG. 4 is a schematic representation of a cross-section of a buckling wire active hood lift mechanism in rest and lift positions.

FIG. 4 depicts an exemplary buckling wire active hood lift mechanism 100 in the rest and lift positions. The hood 12 comprises a rotating pivot point 14 at one end, which provides a means of attachment for hood 12 to a vehicle body (not shown). Active material 18 is fixedly attached to hood 12 at the same end as pivot point 14. At an end opposite pivot point 14, active material 18 is coupled to and in operative communication with connector 112. Connector 112 provides a means of attachment for active material 18 to hood 12 and to an activation device (not shown). A predetermined buckling point 114 is interposed at a position on hood 12 between pivot point 14 and connector 112. In the rest position, shown in FIG. 3 as dashed hood 12, clearance distance 20 is at a minimum.

Producing the activation signal with the activation device (not shown) and applying the activation signal to active material 18 effects a change in at least one property of active material 18. When the change in the property is effected, active material 18 exerts a linear pulling force on hood 12, resulting in hood 12 buckling at predetermined buckling point 114 and an increased clearance distance 20. Under these circumstances, hood 12 is no longer in the rest position, but in the lift position owing to a change in the hood geometry and orientation, shown in FIG. 3 as shaded hood 12. Alternatively, buckling can be distributed along the length of the hood.

In another embodiment, active material 18 may be fixedly attached to hood 12 at an end opposite to pivot point 14; and coupled to and in operative communication with connector 112 at the same end as pivot point 14.

With composite mechanisms, the active material 18 is embedded within the hood 12. Suitable composite active hood lift mechanisms include bowing outer surface mechanisms, spring sandwich mechanisms, and the like.

Figure 5A:
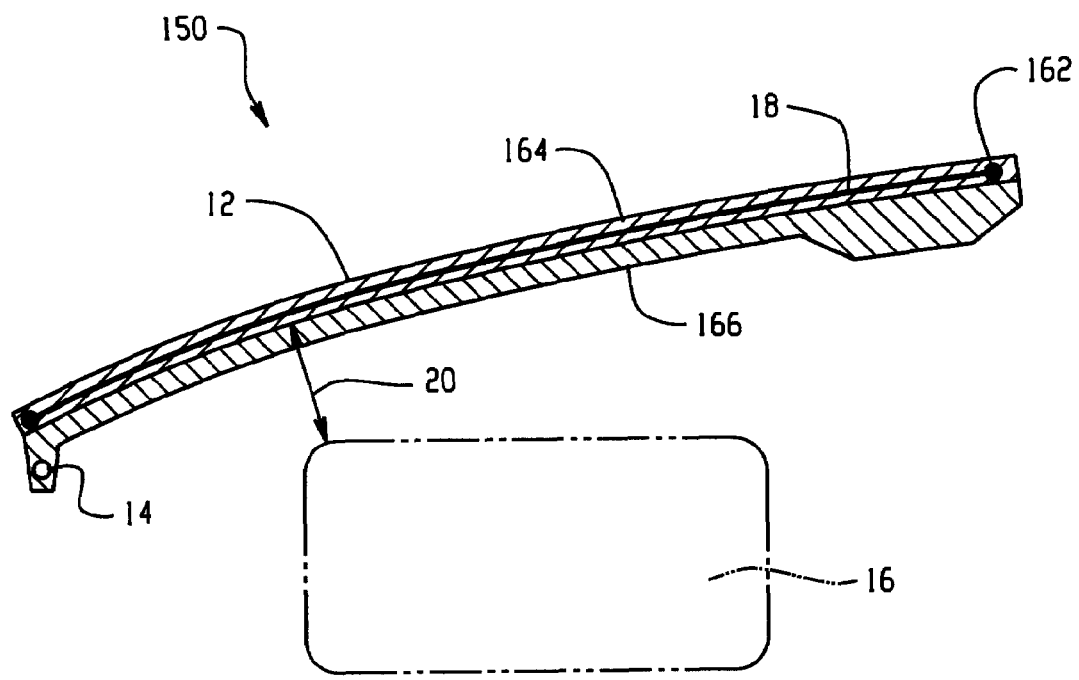
FIG. 5 is a schematic representation of a cross-section of a bowing outer surface active hood lift mechanism in rest (A) and lift (B) positions.
Figure 5B:
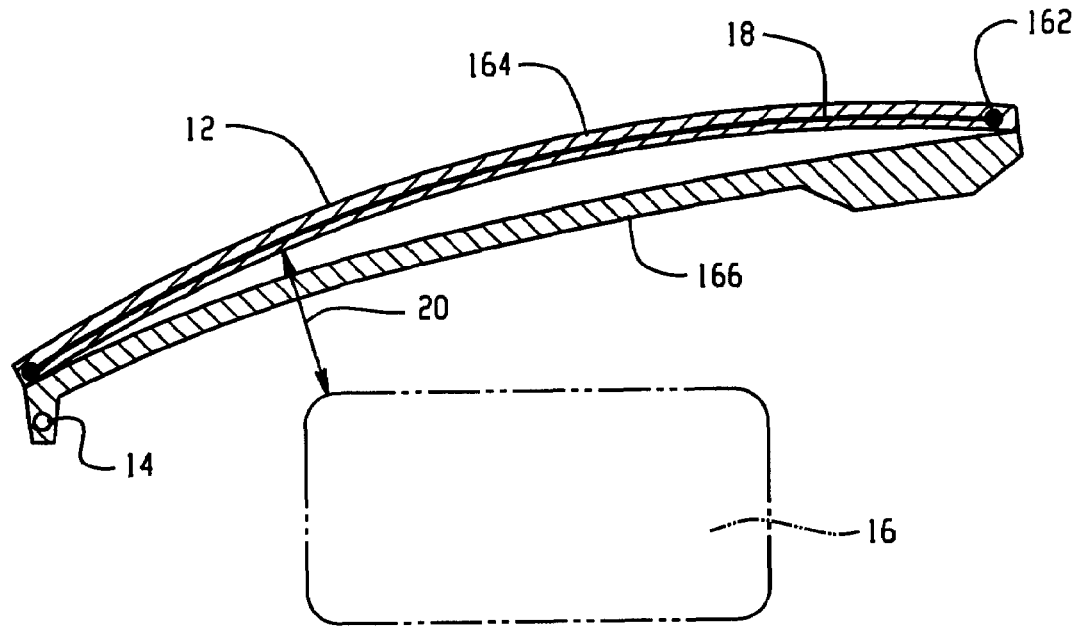

FIG. 5 depicts an exemplary bowing outer surface active hood lift mechanism 150 in rest (5A) and lift (5B) positions. The hood 12 comprises an outer portion 164 and an inner portion 166 as well as a rotating pivot point 14 at one end. Pivot point 14 provides a means of attachment for hood 12 to a vehicle body (not shown). Active material 18 is embedded within outer portion 164 of hood 12. Active material 18 is fixedly attached to hood 12 at the same end as pivot point 14. At an end opposite pivot point 14, active material 18 is coupled to and in operative communication with connector 162. Connector 162 provides a means of attachment for active material 18 to outer portion 164 of hood 12 and to an activation device (not shown). In the rest position shown in FIG. 5A, clearance distance 20 is at a minimum.

Producing the activation signal with the activation device (not shown) and applying the activation signal to active material 18 effects a change in the property of active material 18. When the change in the property is effected, active material 18 exerts a pulling force, resulting in outer portion 164 of hood 12 bowing away from under hood rigid body 16 and an increased clearance distance 20. Under these circumstances, hood 12 is no longer in the rest position, but in the lift position shown in FIG. 5B, owing to a change in the hood geometry and/or orientation. For example, if the active material is a shape memory alloy, the activation signal may comprise a thermal signal, which causes contraction of the shape memory alloy, resulting in a change in hood geometry and/or orientation.

In another embodiment, both the outer portion 164 and inner portion 166 of hood 12 bow away from under hood rigid body 16 when the change in the at least one property is effected. Alternatively, hood 12 may comprise a single portion, which bows away from under hood rigid body 16 when the change in the at least one property is effected.

Figure 6A:
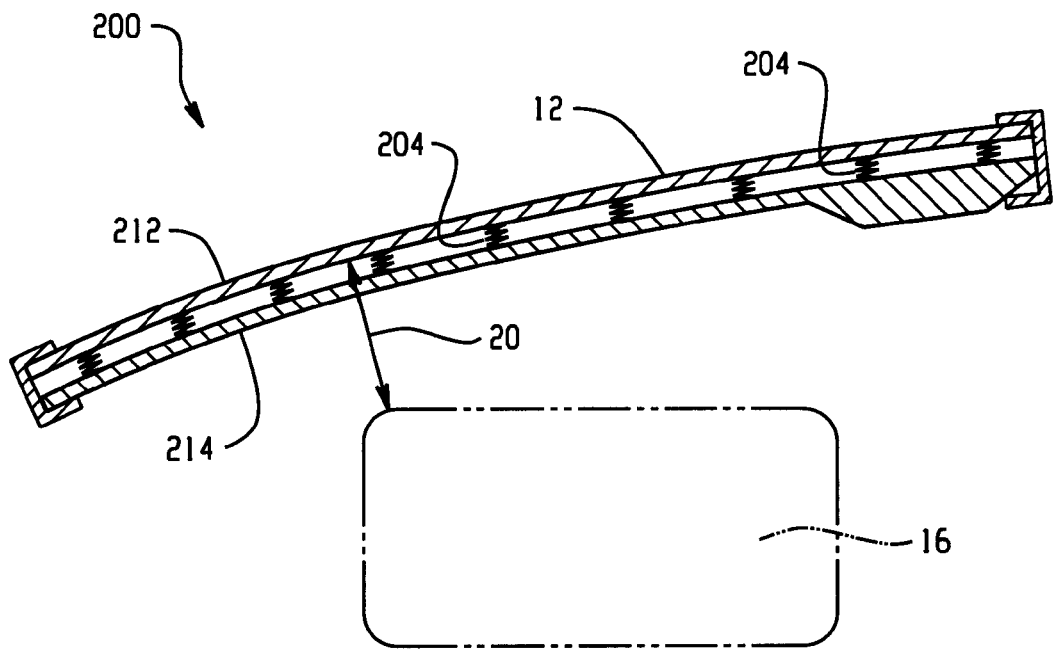
FIG. 6 is a schematic representation of a cross-section of a spring sandwich active hood lift mechanism in rest (A) and lift (B) positions.
Figure 6B:
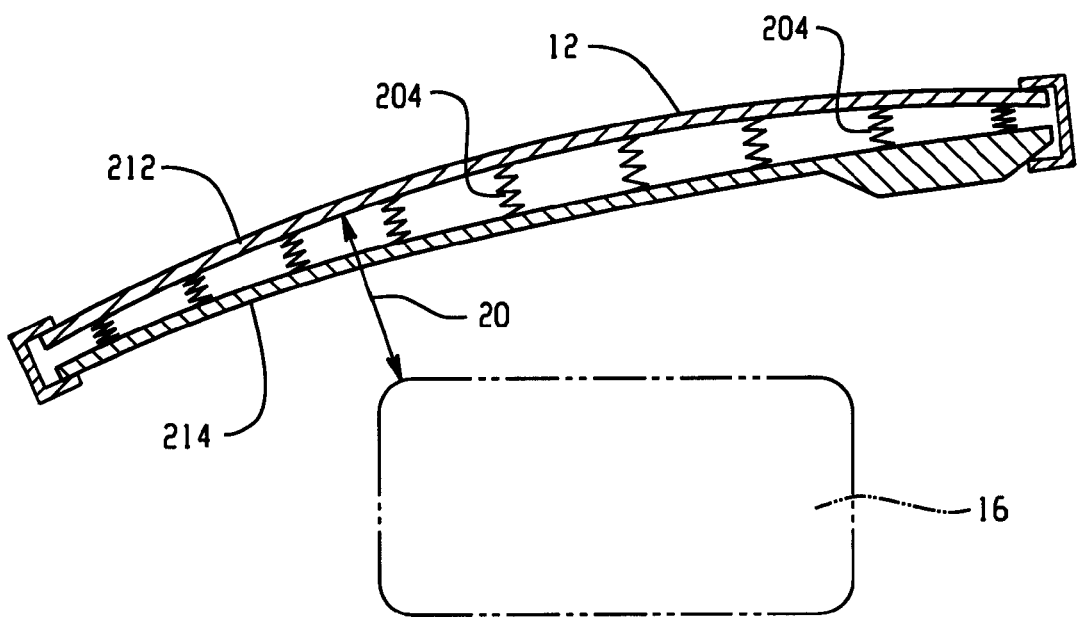

FIG. 6 depicts an exemplary spring sandwich active hood lift mechanism 200 in rest (6A) and lift (6B) positions. The hood 12 comprises an outer portion 212 and an inner portion 214, wherein one or more springs 204 are interposed. The one or more springs 204 exert a pushing force on outer portion 212 of hood 12 away from inner portion 214 of hood 12. The one or more springs 204 are compressed by the active material (not shown), which is embedded in hood 12. In the rest position shown in FIG. 6A, clearance distance 20 is at a minimum Producing the activation signal with the activation device (not shown) and applying the activation signal to the active material effects a change in at least one property of the active material. When the change in the at least one property is effected, the active material releases the one or more springs 204, resulting in outer portion 212 of hood 12 being pushed away from under hood rigid body 16 and an increased clearance distance 20. Under these circumstances, hood 12 is no longer in the rest position, but in the lift position shown in FIG. 6B, owing to a change in the hood location.

In another embodiment, the one or more springs 204 are formed from an active material. Alternatively, the one or more springs 204 may comprise an active material, which optionally is the same active material that is embedded in the hood 12, if present.

With indirect mechanisms, the active material indirectly acts on the hood via a leveraging material. Suitable indirect active hood lift mechanisms include lever mechanisms, wedge mechanisms, cam mechanisms, and the like.

Figure 7A:
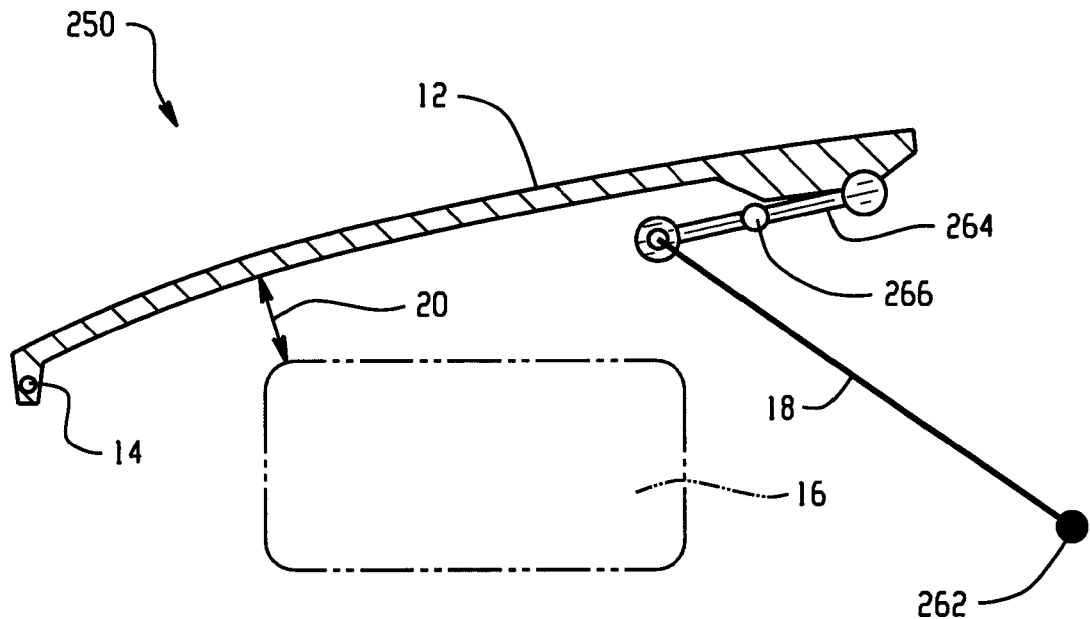
FIG. 7 is a schematic representation of a cross-section of a lever active hood lift mechanism in rest (A) and lift (B) positions.
Figure 7B:
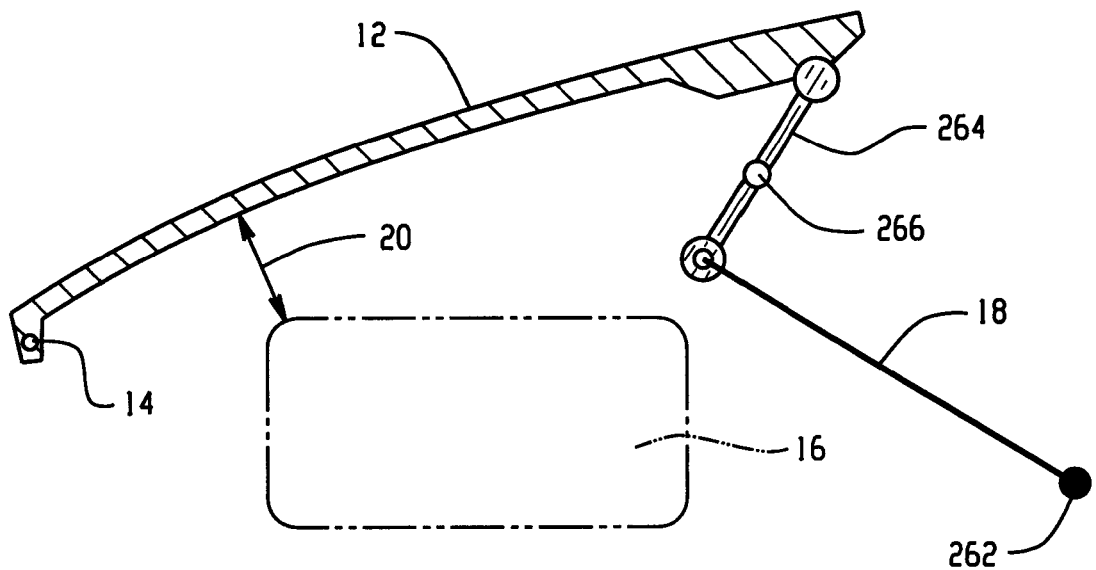

FIG. 7 depicts an exemplary lever active hood lift mechanism 250 in rest (7A) and lift (7B) positions. The hood 12 comprises a rotating pivot point 14 at one end. Pivot point 14 provides a means of attachment for hood 12 to a vehicle body (not shown). A lever 264 is disposed on hood 12 on an end opposite to pivot point 14. On an end opposite to hood 12, active material 18 is disposed on lever 264. Lever 264 may rotate about lever pivot point 266. Connector 262 is coupled to and in operative communication with active material 18 on an end opposite to lever 264. Connector 262 provides a means of attachment for active material 18 to an activation device (not shown). In the rest position shown in FIG. 7A, clearance distance 20 is at a minimum.

Producing the activation signal with the activation device (not shown) and applying the activation signal to active material 18 effects a change in at least one property of active material 18. When the change in the at least one property is effected, active material 18 exerts a linear pulling force on lever 264, which rotates about lever pivot point 266 to increase clearance distance 20 and changes the hood location. Under these circumstances, hood 12 is no longer in the rest position, but in the lift position shown in FIG. 7B.

Figure 8A:
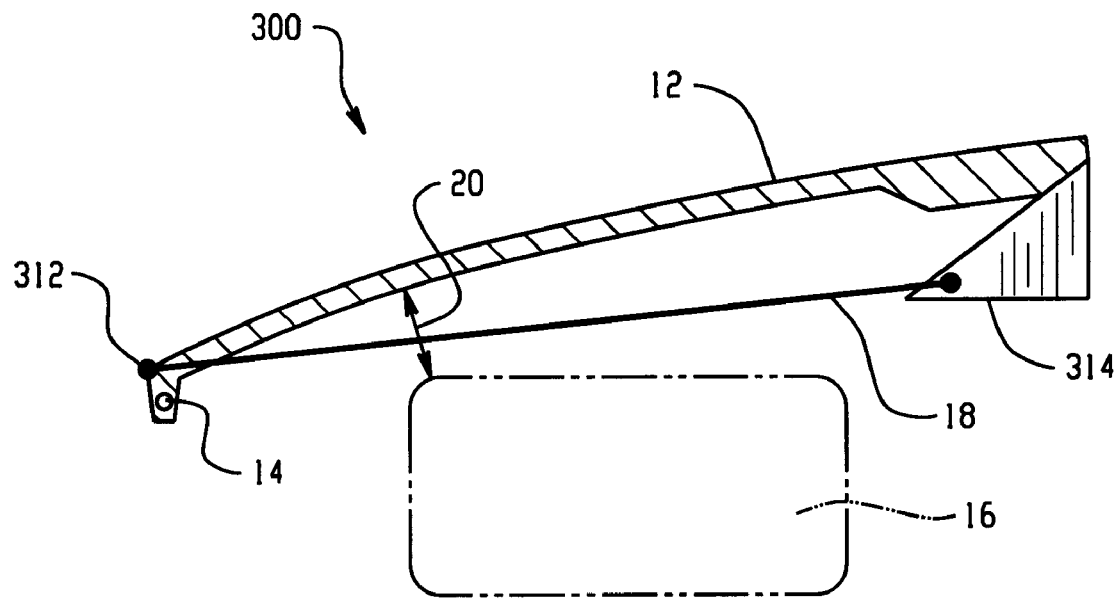
FIG. 8 is a schematic representation of a cross-section of a wedge active hood lift mechanism in rest (A) and lift (B) positions.
Figure 8B:
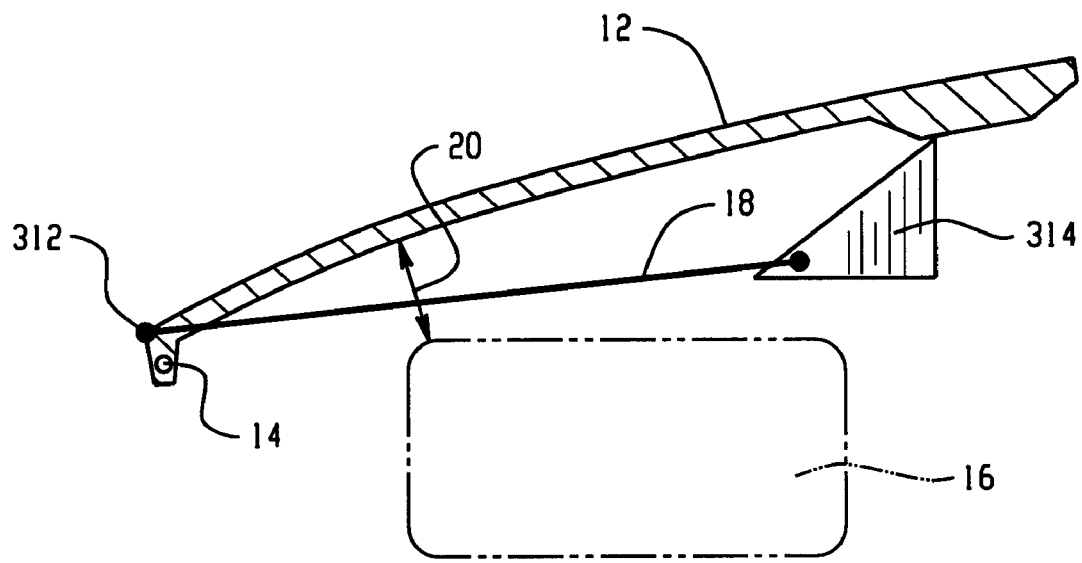

FIG. 8 depicts an exemplary wedge active hood lift mechanism 300 in rest (8A) and lift (8B) positions. The hood 12 comprises a rotating pivot point 14 at one end. Pivot point 14 provides a means of attachment for hood 12 to a vehicle body (not shown). A wedge 314 is disposed in proximity to hood 12 on an end opposite to pivot point 304. Active material 18 is fixedly attached to wedge 314. At an end opposite wedge 314, and the same as pivot point 14, active material 18 is coupled to and in operative communication with connector 312. Connector 312 provides a means of attachment for active material 18 to hood 12 and to an activation device (not shown). In the rest position shown in FIG. 8A, clearance distance 20 is at a minimum.

Producing the activation signal with the activation device (not shown) and applying the activation signal to active material 18 effects a change in at least one property of active material 18. When the change in the at least one property is effected, active material 18 exerts a linear pulling force on wedge 314 towards connector 312, resulting in an increased clearance distance 20. Under these circumstances, hood 12 is no longer in the rest position, but in the lift position shown in FIG. 8B, owing to a change in the hood location.

In another embodiment, active material 18 may be fixedly attached to hood 12 at an end opposite to wedge 314; and coupled to and in operative communication with connector 312 at wedge 314.

Figure 9A:
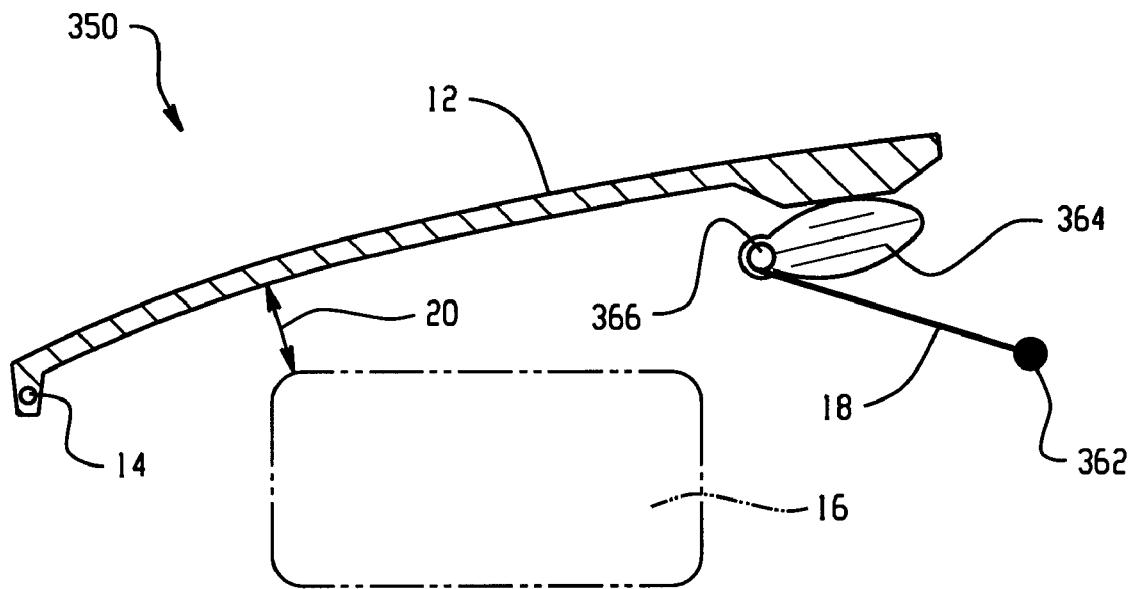
FIG. 9 is a schematic representation of a cross-section of a cam active hood lift mechanism in rest (A) and lift (B) positions.
Figure 9B:
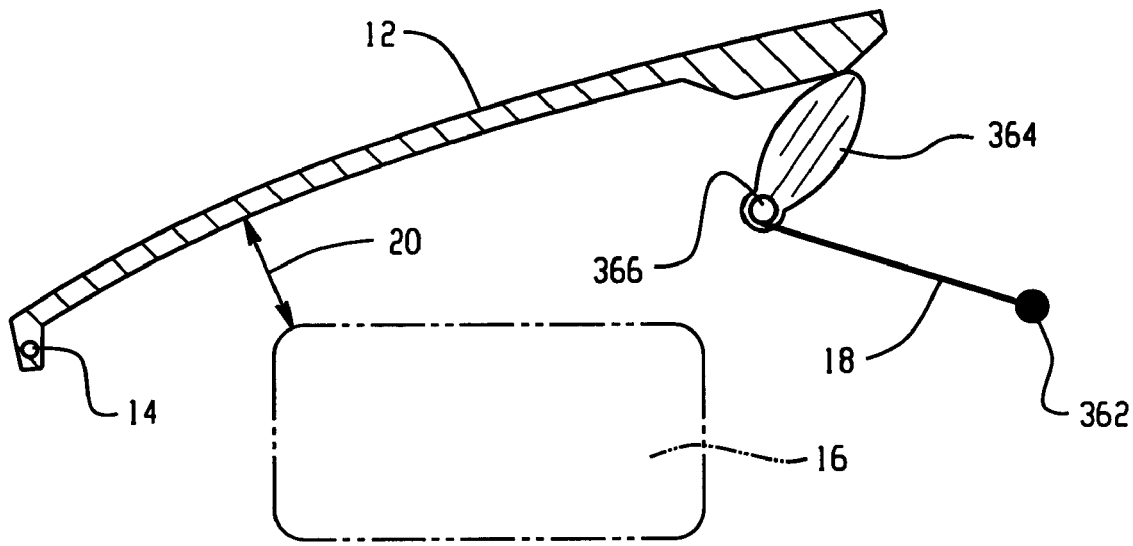

FIG. 9 depicts an exemplary cam active hood lift mechanism 350 in rest (9A) and lift (9B) positions. The hood 12 comprises a rotating pivot point 14 at one end. Pivot point 14 provides a means of attachment for hood 12 to a vehicle body (not shown). A cam 364 is disposed on hood 12 on an end opposite to pivot point 14. On an end opposite to hood 12, active material 18 is coupled and in operative communication with cam 364 at cam pivot point 366. Cam 364 may rotate about cam pivot point 366. Connector 362 is coupled to and in operative communication with active material 18 on an end opposite to cam 364. Connector 362 provides a means of attachment for active material 18 to an activation device (not shown). In the rest position shown in FIG. 9A, clearance distance 20 is at a minimum.

Producing the activation signal with the activation device (not shown) and applying the activation signal to active material 18 effects a change in at least one property of active material 18. When the change in the at least one property is effected, active material 18 exerts a linear pulling force on cam 364, which rotates about cam pivot point 366 to increase clearance distance 20 and changes the hood location. Under these circumstances, hood 12 is no longer in the rest position, but in the lift position, shown in FIG. 9B.

In another embodiment, the cam could be rotated by a torsional dowel made of SMA, for example, to lift the hood when the SMA is heated. A torsional spring could reset the cam when the SAM is cooled. The cam profile could be designed with a flat top or a notch so that the hood could be held in the lifted position.

In some embodiments, a passive hood lift mechanism may be employed, wherein a stored energy is taken advantage of to cause the change from the rest position to the lift position. Passive hood lift mechanisms include external and in-hood passive hood lift mechanisms.

With external mechanisms, the active material 18 releases energy that is stored in an external device such as for example a spring. Suitable external passive hood lift mechanisms include coil spring mechanisms, leaf spring mechanisms, and the like.

Figure 10A:
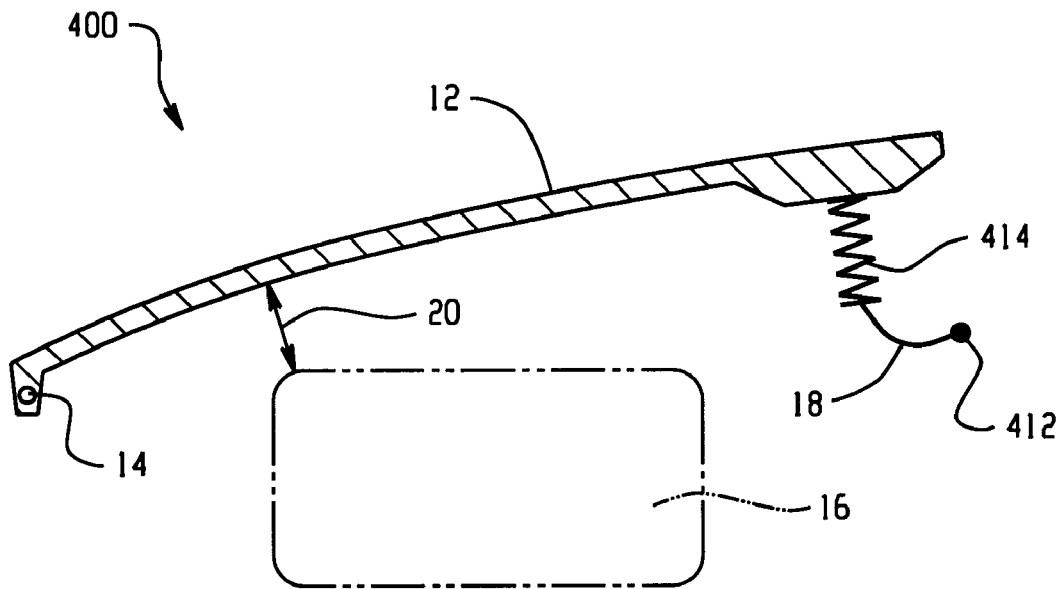
FIG. 10 is a schematic representation of a cross-section of a coil spring passive hood lift mechanism in rest (A) and lift (B) positions.
Figure 10B:
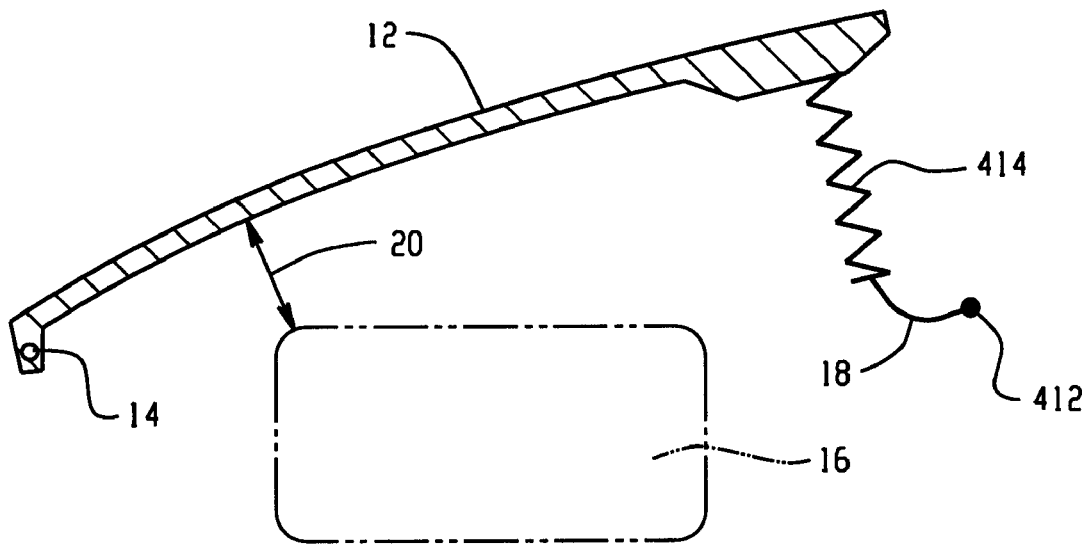

FIG. 10 depicts an exemplary coil spring passive hood lift mechanism 400 in rest (10A) and lift (10B) positions. The hood 12 comprises a rotating pivot point 14 at one end. Pivot point 14 provides a means of attachment for hood 12 to a vehicle body (not shown). One or more coil springs 414 are disposed on hood 12 on an end opposite to pivot point 404. On an end opposite hood 12, the one or more coil springs 414 are disposed on the vehicle body. The one or more coil springs 414 exert a pushing force on hood 12 away from the vehicle body. On an end opposite hood 12, and the same end as the vehicle body, active material 18 is coupled to and in operative communication with the one or more coil springs 414. The one or more coil springs 414 are compressed by the active material (not shown). Connector 412 is coupled to and in operative communication with active material 18 on an end opposite to the one or more coil springs 414. Connector 412 provides a means of attachment for active material 18 to an activation device (not shown). In the rest position shown in FIG. 10A, clearance distance 20 is at a minimum.

Producing the activation signal with the activation device (not shown) and applying the activation signal to active material 18 effects a change in at least one property of active material 18. When the change in the at least one property is effected, active material 18 releases the one or more coil springs 414 to an uncompressed position, resulting in hood 12 being pushed away from under hood rigid body 16 and an increased clearance distance 20. Under these circumstances, hood 12 is no longer in the rest position, but in the lift position shown in FIG. 10B, owing to a change in the hood location.

In another embodiment, the one or more coil springs 414 may be formed from an active material the same as or different from active material 18, if present.

Figure 11A:
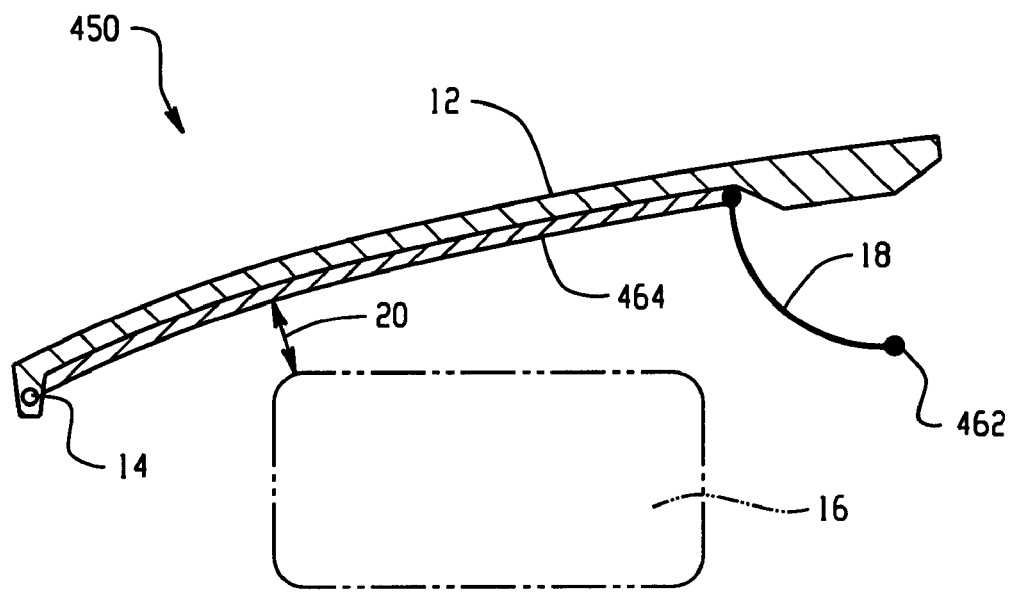
FIG. 11 is a schematic representation of a cross-section of a tensioned leaf spring passive hood lift mechanism in rest (A) and lift (B) positions.
Figure 11B:
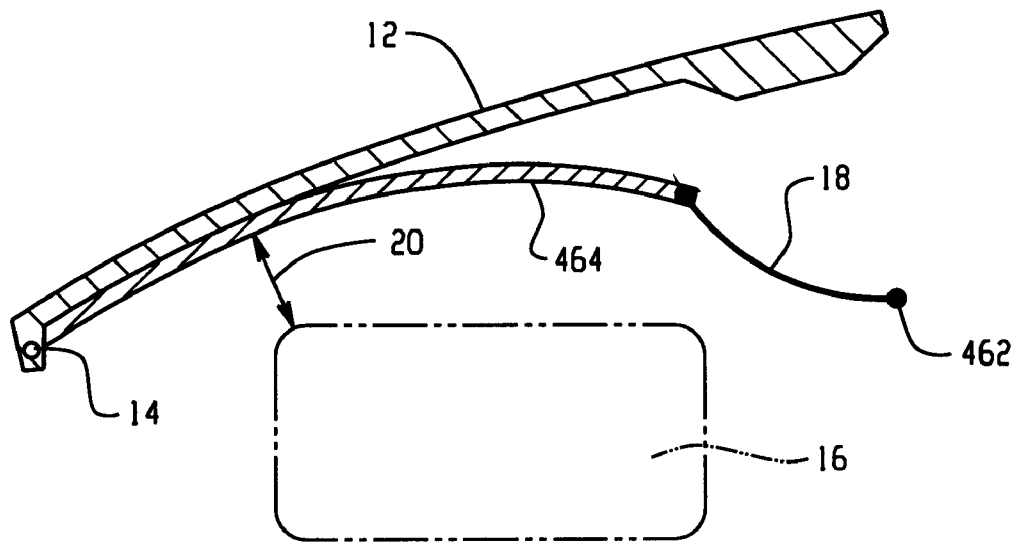

FIG. 11 depicts an exemplary leaf spring passive hood lift mechanism 450 in rest (11A) and lift (11B) positions. The hood 12 comprises a rotating pivot point 14 at one end. Pivot point 14 provides a means of attachment for hood 12 to a vehicle body (not shown). One or more leaf springs 464 are fixedly attached on one end to hood 12 at the same end as pivot point 14. The one or more leaf springs 464 are held in tension against hood 12 at an end opposite pivot point 14. Active material 18 is coupled to and in operative communication with the one or more leaf springs 464 at the end opposite pivot point 14. Active material 18 provides a means of attachment for the one or more leaf springs 464 to hood 12. At an end opposite the one or more leaf springs 464, active material 18 is coupled to and in operative communication with connector 462. Connector 462 provides a means of attachment for active material 18 to an activation device (not shown). In the rest position shown in FIG. 11A, clearance distance 20 is at a minimum.

Producing the activation signal with the activation device (not shown) and applying the activation signal to active material 18 effects a change in at least one property of active material 18. When the change in the at least one property is effected, active material 18 releases the one or more leaf springs 464 from hood 12, resulting in hood 12 bowing away from under hood rigid body 16 and an increased clearance distance 20. Under these circumstances, hood 12 is no longer in the rest position, but in the lift position shown in FIG. 11B, owing to a change in the hood geometry and location. Optionally, the leaf spring is formed of the active material.

With in-hood mechanisms, the active material 18 releases energy that is stored in a pre-compression configuration of the hood 12. Suitable in-hood passive hood lift mechanisms include center latch mechanisms, end latch mechanisms, and the like. Optionally, the latch can be at a location apart from the actuator location, e.g., a rotary latch at the front hinge.

Figure 12A:
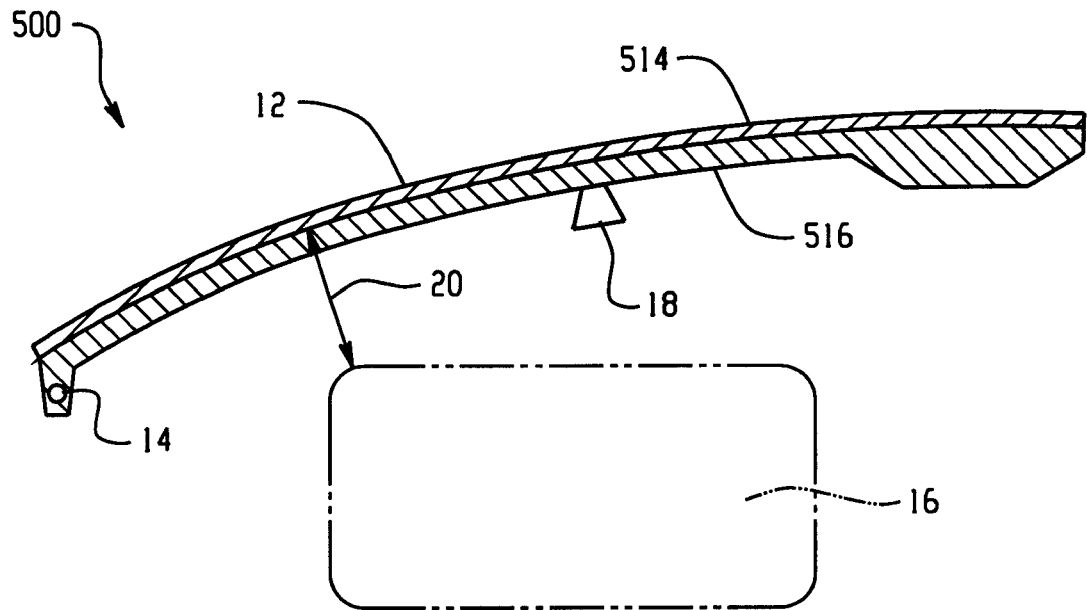
FIG. 12 is a schematic representation of a cross-section of a center latch compressed hood passive hood lift mechanism in rest (A) and lift (B) positions.
Figure 12B:
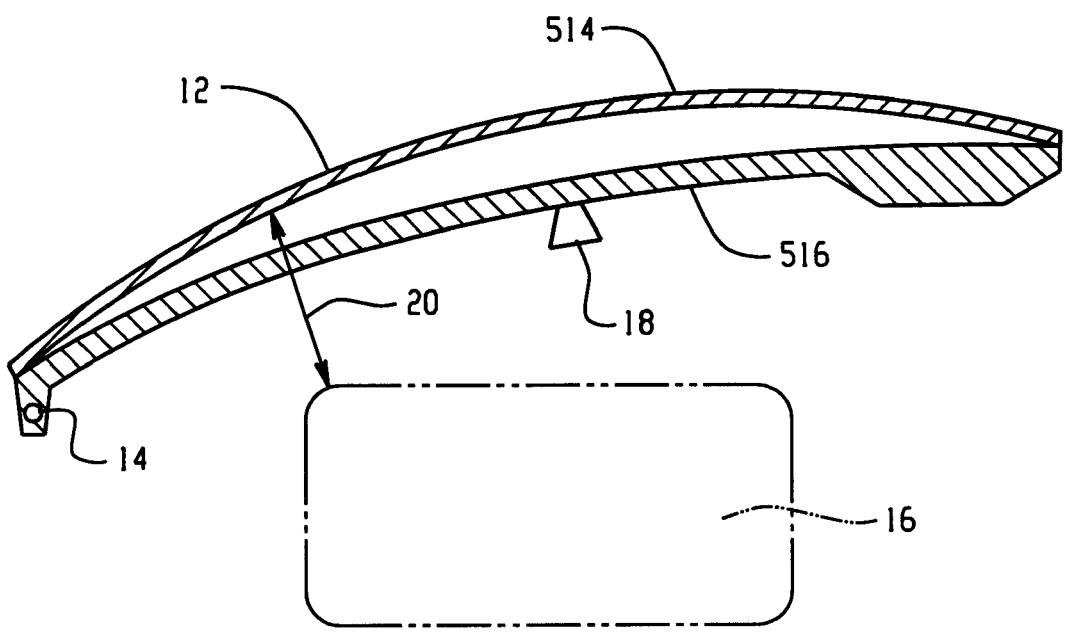

FIG. 12 depicts an exemplary center latch passive hood lift mechanism 500 in rest (12A) and lift (12B) positions. The hood 12 comprises an outer portion 514 and an inner portion 516 as well as a rotating pivot point 14 at one end. Pivot point 14 provides a means of attachment for hood 12 to a vehicle body (not shown). Active material 18 is interposed at any position on hood 12 between pivot point 14 and an end opposite to pivot point 14. Active material 18 is coupled to and in operative communication with hood 12. Active material 18 provides a means of attachment for outer portion 514 and inner portion 516 of hood 12. At an end opposite hood 12, active material 18 is coupled to and in operative communication with a connector (not shown). The connector provides a means of attachment for active material 18 to an activation device (not shown). In the rest position, shown in FIG. 12A, clearance distance 20 is at a minimum.

Producing the activation signal with the activation device (not shown) and applying the activation signal to active material 18 effects a change in the property of active material 18. When the change in the property is effected, the release of outer portion 514 of hood 12 from inner portion 516 of hood 12 is effected, resulting in outer portion 514 of hood 12 bowing away from under hood rigid body 16 and an increased clearance distance 20. Under these circumstances, hood 12 is no longer in the rest position, but in the lift position shown in FIG. 12B, owing to a change in the hood geometry and/or orientation.

Figure 13A:
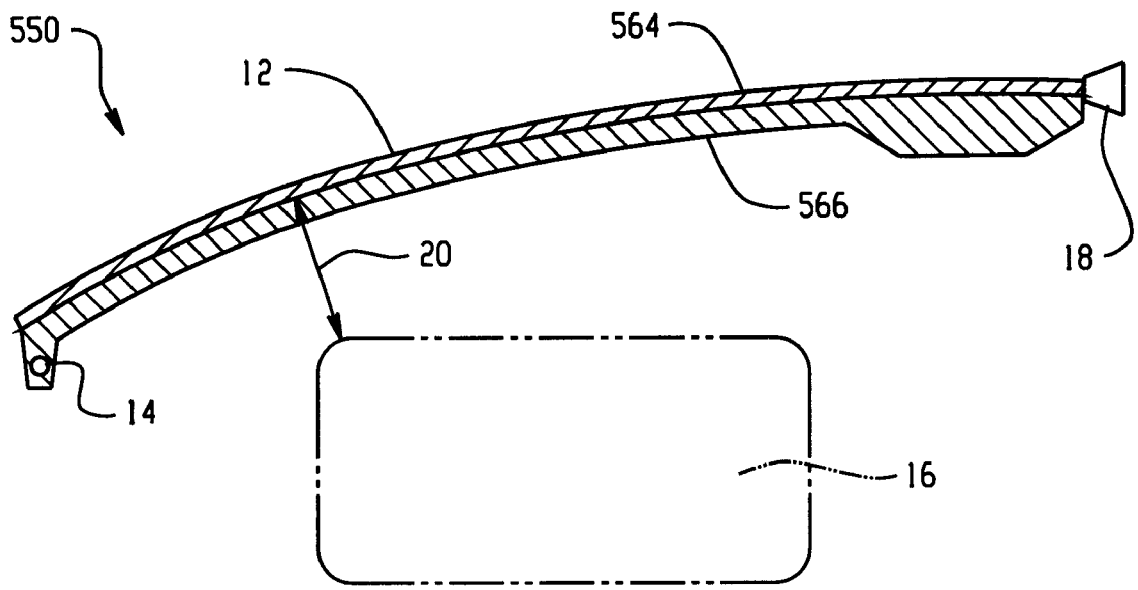
FIG. 13 is a schematic representation of a cross-section of an end latch tensioned hood passive hood lift mechanism in rest (A) and lift (B) positions.
Figure 13B:
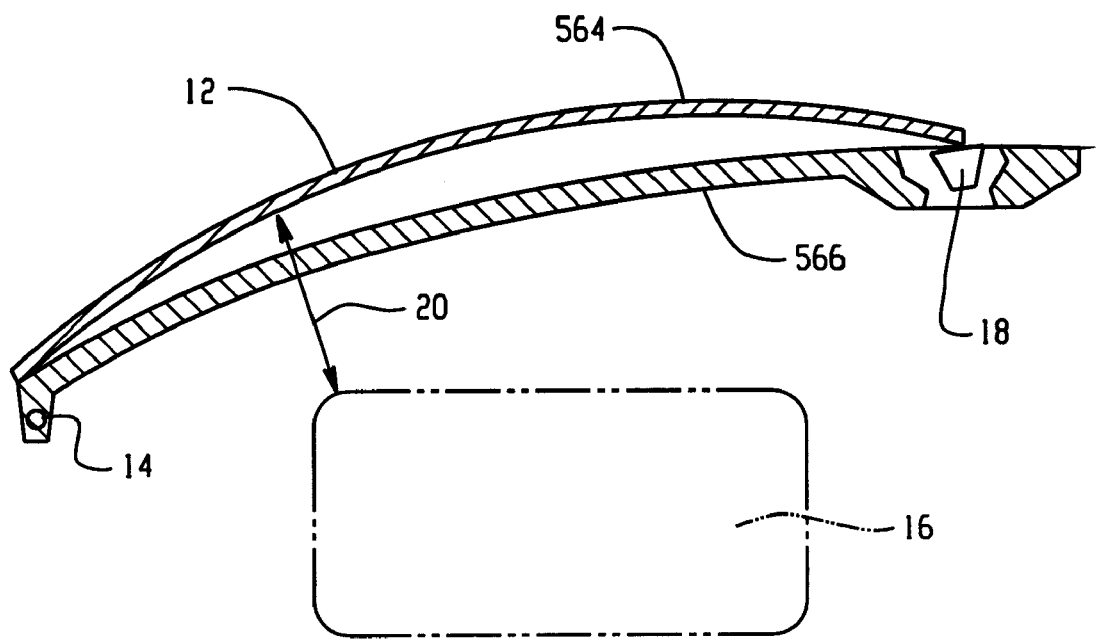

FIG. 13 depicts an exemplary end latch passive hood lift mechanism 550 in rest (13A) and lift (13B) positions. The hood 12 comprises an outer portion 564 and an inner portion 566 as well as a rotating pivot point 14 at one end. Pivot point 14 provides a means of attachment for hood 12 to a vehicle body (not shown). Active material 18 is disposed on hood 12 at an end opposite to pivot point 14. Active material 18 is coupled to and in operative communication with hood 12. Active material 18 provides a means of attachment for outer portion 564 and inner portion 566 of hood 12. At an end opposite hood 12, active material 18 is coupled to and in operative communication with a connector (not shown). The connector provides a means of attachment for active material 18 to an activation device (not shown). In the rest position, shown in FIG. 13A, clearance distance 20 is at a minimum.

Producing the activation signal with the activation device (not shown) and applying the activation signal to active material 18 effects a change in at least one property of active material 18. When the change in the at least one property is effected, the release of outer portion 564 of hood 12 from inner portion 566 of hood 12 is effected, resulting in outer portion 564 of hood 12 bowing away from under hood rigid body 16 and an increased clearance distance 20. Under these circumstances, hood 12 is no longer in the rest position, but in the lift position shown in FIG. 13B, owing to a change in the hood geometry and/or orientation. Alternatively, the hood can be configured such that the entire hood panel bows to provide the increased clearance.

Figure 14:
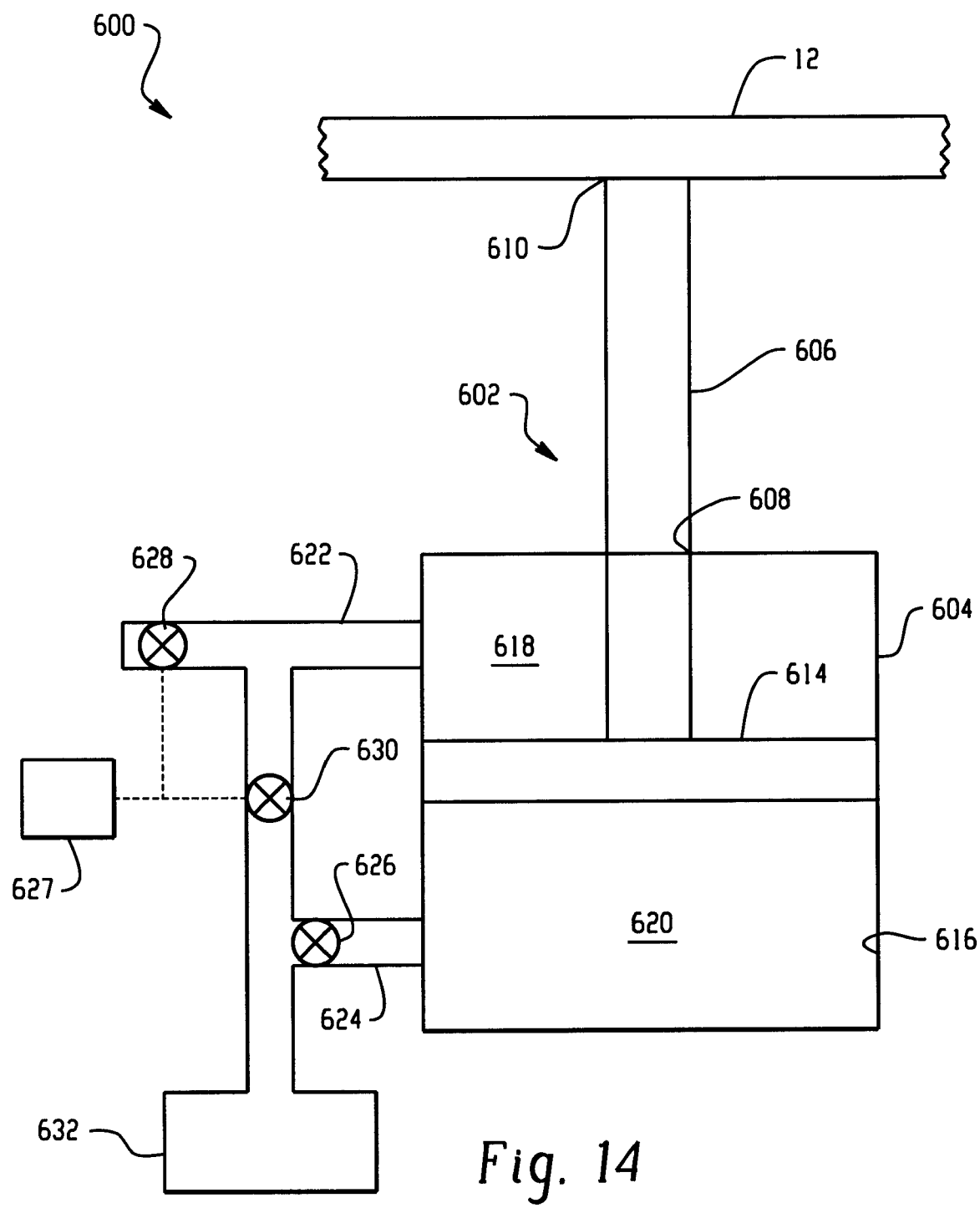
FIG. 14 is a schematic representation of a cross-section of a dual chamber lifter in accordance with one embodiment.

FIG. 14 illustrates a dual chamber lifter, generally designated by reference numeral 600. The dual chamber lifter is a pneumatic actuator employing at least one valve selectively opened and closed with active materials. The lifter 600 raises the hood (or any object in contact therewith) by gas pressure in fluid communication with a piston. In contrast to conventional gas springs, the chambers above and below the piston are pressurized. A pressure differential can be created to bias the piston in one direction relative to another or equal pressure can be maintained in each chamber to render the piston stationary. As such, the device can be tailored to have a zero net force on the hood, can lift the hood top a desired position, or can pull the hood from a lifted position to a restored position. For example, upon release of pressure from the upper chamber, the pressure from the lower chamber, which is below the piston, forces displacement of the piston so as to raise the hood. As will be discussed in greater detail below, the valves can be actuated by activation of an active material, e.g., thermal activation of shape memory alloy wires, motion amplified piezoelectric active material and the like.

The dual chamber lifter includes a piston assembly 602 slidably disposed within a sealed housing 604. The piston assembly 602 includes a shaft 606 slidably disposed within an aperture 608 of the housing 604. The shaft 606 has one free end 610 for lifting the hood 12 and another end that defines a piston head 614, which is slidably engaged with interior sidewalls 616 of the housing 604. Optionally, the one free end 610 is secured and/or integrated with the hood 12. The piston head defines a first chamber 618 and a second chamber 620 within the housing. Each chamber 618, 620 includes a fluid passageway 622, 624 for controlling movement of the piston assembly within the housing, i.e., controlling movement of hood.

Disposed within the fluid passageway 624 is a first quick release valve 626 formed of an active material for controlling the pressure within chamber 620. By way of example, the quick release active valve 626 is driven by a shape memory alloy (SMA), although other active materials can be employed with similar results. As will be described in greater detail below, the SMA driven quick release valve 626 includes a multiplicity of SMA wire sections for moving a movable element from a biased first position to a second position when activated, e.g., thermal activation. A controller 627 is in operative communication with the active material and can be programmed to selectively provide a suitable activation signal, e.g., in the case of SMAs current can be regulated and may be governed by a position measurement to regulate current to the SMA drive element to position the movable element to a desired position. Still further, the resistance can be measured to provide an indication of the heated state of the wire by measuring the current and voltage across the wire. The quick release active valve 626 may also include a temperature controller (not shown) governed by temperature signal provided by a temperature-sensing means in proximity to the SMA element to activate a cooling device for reducing the temperature surrounding the SMA element. The controller may also be governed by both a position measurement and a temperature signal to regulate current to the SMA drive element and to control the cooling device to position the movable element to a desired position.

Second and third valves 628, 630 can be employed to regulate pressure within chamber 618 and are in fluid communication with conduit 622. The valves can be regulated by a single controller or may include individual controllers programmed to act in concert such that the piston assembly 602 can be selectively and reversibly moved. In one embodiment, conventional valves are used. In other embodiments, these valves can be controlled with active materials in a similar manner to the quick release active valve 626 discussed above. The dual chamber lifter 600 may further include a pump 632 for resetting the position of the piston head 614. For example, when the lifter is in a raised position, valve 624 can be selectively opened and vacuum pump turned on while valve 626 remains in the closed position and valve 628 in the opened position. Numerous combinations of opening and closing the various valves can be employed to provide lifting and resetting as will be apparent to those skilled in the art in view of this disclosure. It should also be noted that the pump can be a conventional pump such as those currently employed for controlling bladder pressure within a seat or load leveling suspension systems, as examples, or a active material based pump can be used.

Optionally, the device may first lower the hood by means of a second active material based valve attached to the volume below the piston that vents the pressure below the piston and allows the hood to return to it original position under the influence of gravity and/or pressure added to the upper chamber. In this embodiment, the second and third valves can comprise an active material based mechanism. Re-pressurizing both chambers can then be used to reset the device.

Figure 15:
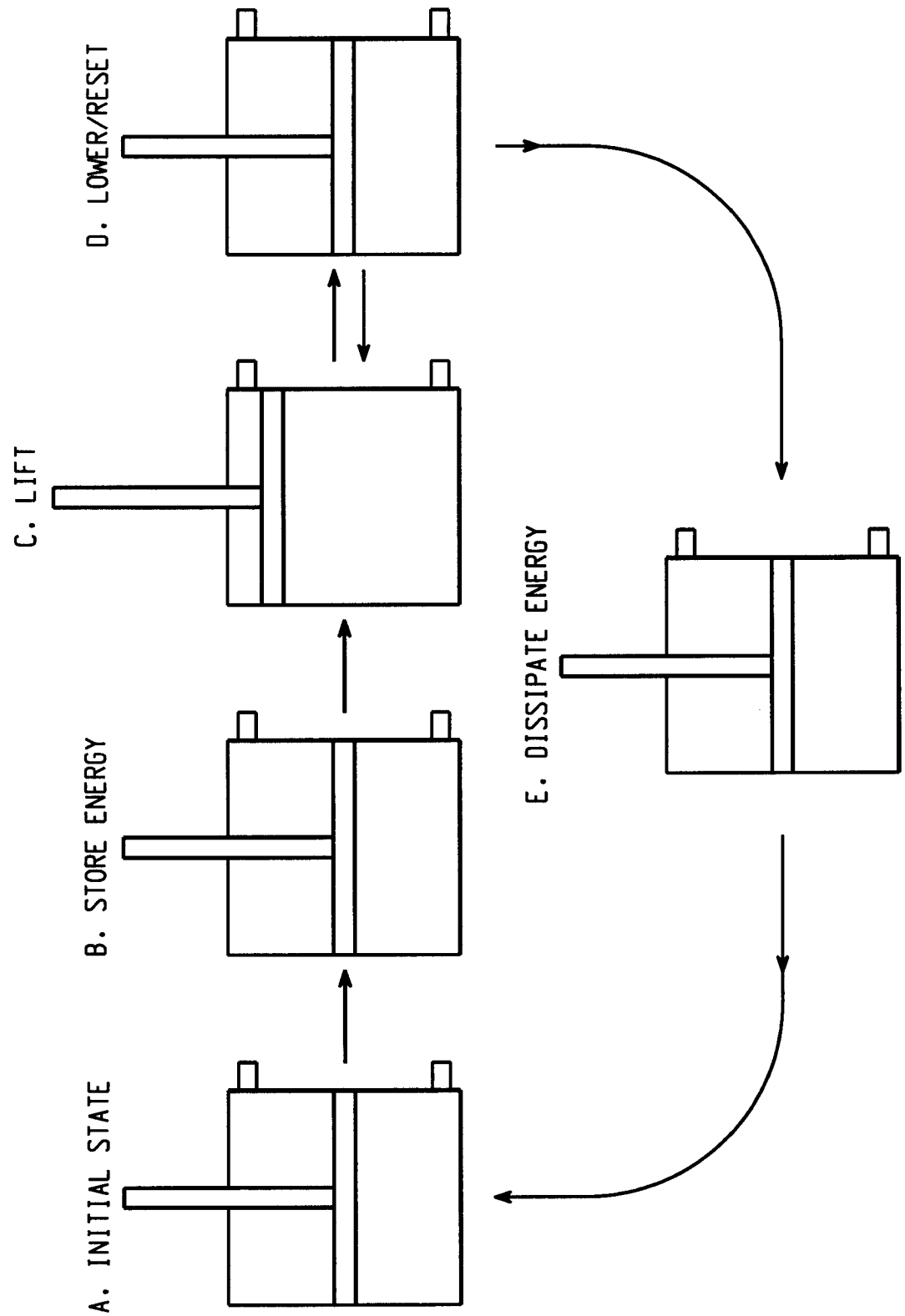
FIG. 15 is a schematic representation of a cycle of operation of a dual chamber lifter in accordance with one embodiment.

FIG. 15 illustrates an exemplary cycle of operation. In the initial state shown in Step A, the valves of the device 600 are in the closed position and the pump is in the off position. To store energy as illustrated in Step B, the pump is employed to pressurize chambers 618, 620 while maintaining the valves (e.g., 626, 628, 630) in the closed position. In this manner, the lifter can advantageously used to hold the hood in a fixed position by securing the shaft 606 to an underside of the hood thereby obviating the need for a hood latch, if desired. In Step C, valve 628 is opened to permit evacuation of chamber 618 and cause a pressure differential between the chambers. The pressure differential moves the piston assembly 602 upwards, thereby raising the hood. In Step D, the hood can be reversibly lowered or raised as may be desired. The valves are closed and the top chamber is re-pressurized with pump 632 so as to store energy in the resulting compression of the piston towards chamber 620. To accomplish this, valve 630 is opened while maintaining valves 628 and 626 in the close positions. While in this state, the device 600 can then be used to lift the hood by selective opening of the valve 628. To dissipate the stored energy as illustrated in Step E, the valves 626, 628, and 630 are opened such that both chambers 618, 620 are vented.

Figure 16:
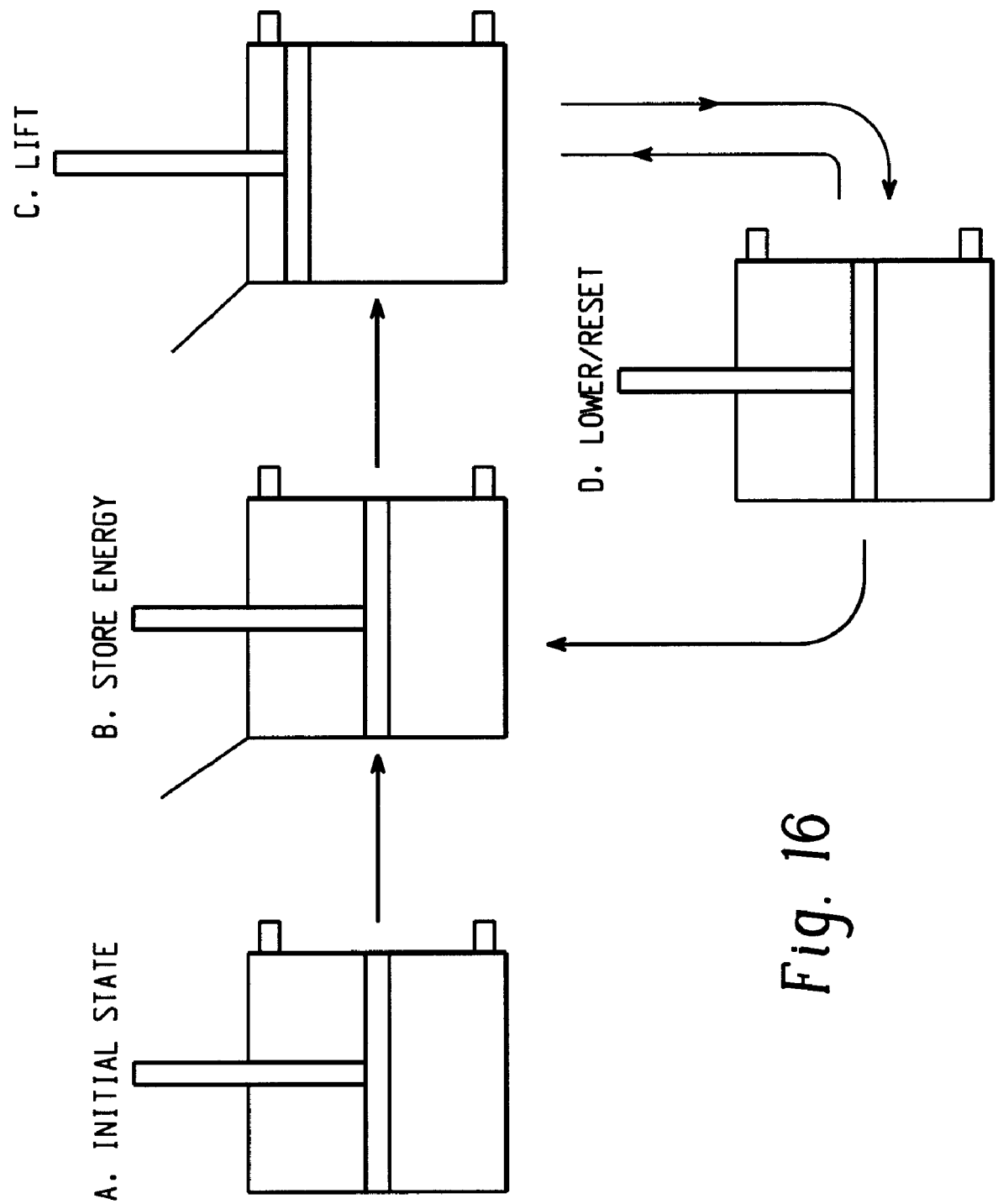
FIG. 16 is a schematic representation of a cycle of operation of a dual chamber lifter in accordance with another embodiment.

In an alternative embodiment of a cycle of operation shown FIG. 16, the device can be configured for a service state. In Step D, the valves 626, 628, and 630 are opened and the piston is lowered as a function of the gravitational force of the hood 12 on the piston assembly 602. Valves 626, 628 are then closed and the top chamber 618 re-pressurized to reposition the hood 12. Still further, the dual chamber lifter can function similarly to a valve such that it may be a variable speed lift device that responds to a pre-crash sensor with a slower speed and to an impact sensor with a faster speed.

Figure 17:
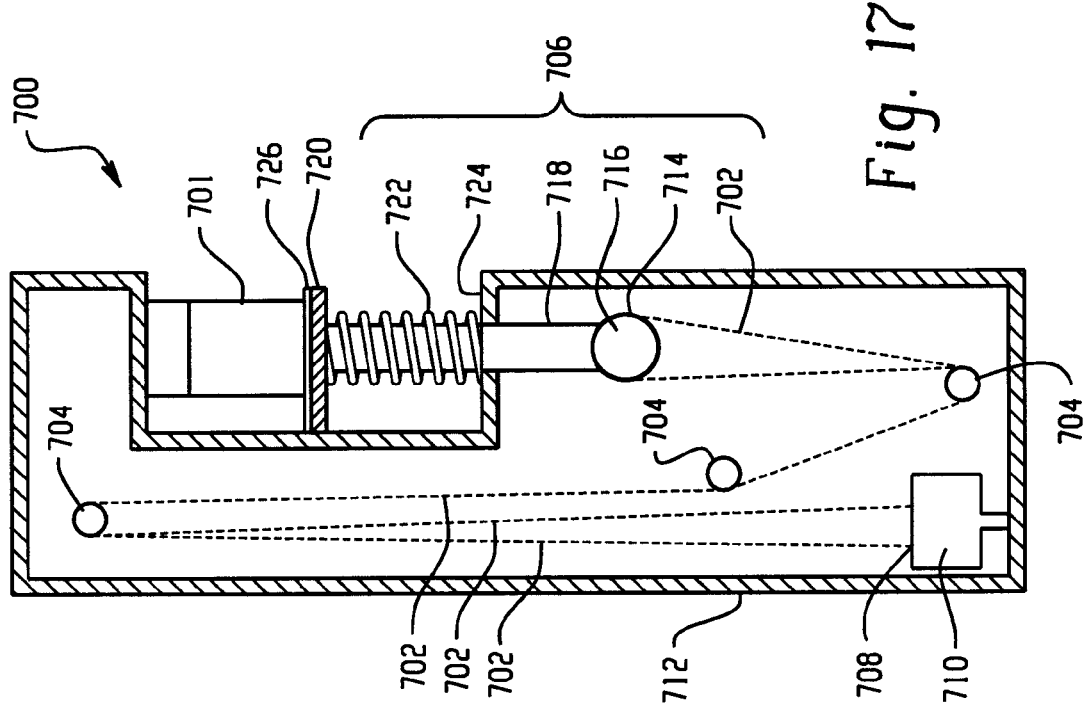
FIG. 17 is a schematic representation of cross section of a valve for selectively opening and closing a fluid passageway.

FIG. 17 illustrates a sectional view of a quick release active valve employing a shape memory alloy suitable for use with the dual lift valve. The quick release active valve 700 is in operative communication with a fluid inlet 701 in fluid communication with a chamber e.g., 618. One or more wires 702 formed of the SMA are wound about various pivot points 704 to selectively move a spring mounted valve guide 706 in sealing communication with the fluid inlet. One end 708 of the wires 702 is fixedly attached to a mounting element 710, which is securely mounted to the housing 712. The other end 714 is in operative communication with a pull bar 716, which is coupled to the valve guide 706. The valve guide 706 includes a shaft 718 having a terminal end to which the rotor 716 is attached and a plate 720 at the other end. A gasket is preferably disposed intermediate the plate and the fluid inlet. The shaft 718 is slidably engaged within an aperture of the housing. A bias spring 722 is intermediate the plate 720 and a wall 724 of the housing to provide a restoring force when the shape memory alloy wires are deactivated. The spring holds the valve closed against the full pressure inside the chamber and the shape memory alloy wire (or other active material configuration) acts against the spring with the help of the pressure. In this manner, the quick release active valve can be selectively opened and closed. Likewise, the dual chamber lifter device can be reset by re-pressurizing volume above the piston which forces the piston to the original piston or may employ the gravitational force exerted by the hood on the piston following release of pressure within the upper chamber.

Figure 18:
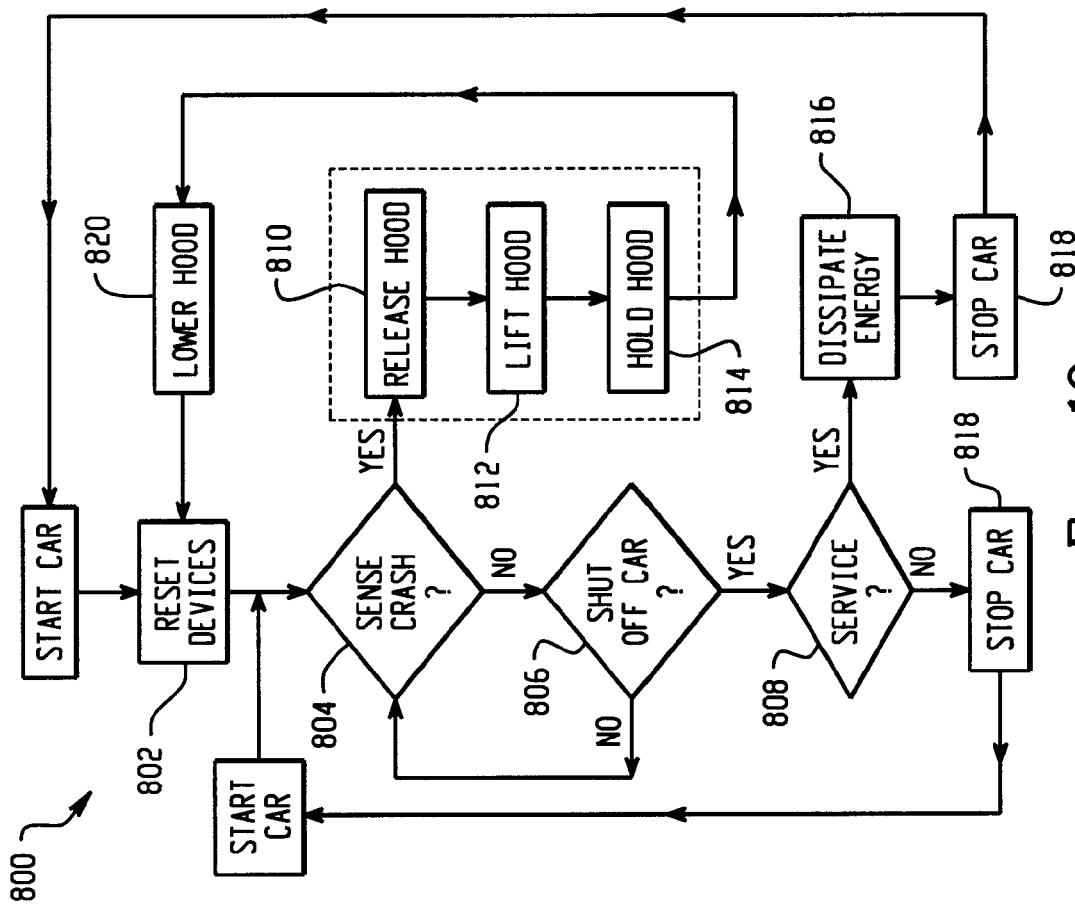
FIG. 18 illustrates a process flow of exemplary control logic for reversibly and selectively activating a dual chamber hood lifter.

In FIG. 18, an exemplary control logic flow chart 800 is illustrated using the hood lift actuator. As noted, the response of the mitigation device to the signal may be reversible (to prevent damage in the event that an impact does not occur) and/or may be tailored both locally and globally to the particular nature of the impact event. It may also, for example, in the case of stiffness changes, be unnoticeable or undetectable (fully reversible), unless an impact occurs, to the vehicle operator. Further, there is minimal interference with vehicle operation. Using hood lift actuator 600 as an example, upon starting the vehicle, energy within the hood lift actuator is generated as noted in step 802 by pressurizing each chamber 618, 620. At step 804, the hood lift actuator can be selectively actuated in the event a crash is sensed. If a hood release is present, the hood is released at 810 to permit lifting at 812. The hood is then maintained in the lift position at 814 until the hood is lowered at 820, which can then be reset at step 802 in the manner previously discussed. Once reset, the actuator 600 can be used to detect a condition.

In the event a crash is not sensed as noted in step 806, the dual chamber lifter 600 can be turned off and any activation energy that may have initially been provided to the active material (e.g., preheat a shape memory alloy to just below the phase transformation temperature so as to speed the response, if desired) the stored activation energy can be discontinued as in step 816 so as to dissipate energy. In this manner, the device can be readily serviced as indicated by step 808. In one mode of operation, the mechanism is unpowered during normal driving and certain valves are selectively activated or powered when triggered by an output signal from a controller based on input to it from an impact or pre-impact sensor. Such a mechanism would remain activated through the impact event but then automatically be deactivated upon the conclusion of the impact to restore the hood. In an alternative embodiment, the mechanism would be deactivated upon a timer timing out, which would be useful in the case of a false detect. Alternatively, the control logic can be configured to permit servicing as indicated by step 808. It should be apparent from the control logic flow chart that there are two paths when shutting off the vehicle. For service, the energy is dissipated whereas if service is not desired, the energy is not dissipated.

The hood lift mechanisms shown are exemplary only and are not intended to be limited to any particular shape, size, configuration, material composition, or the like. Although the hood lift mechanisms described comprise a pivot point on one end of the hood, other embodiments include multiple pivot points on one or more than one end of the hood 12 to enable lifting on any end based on necessity of increased energy absorption on those ends at a given point. One hood lift mechanism may be implemented so as to provide a single discrete means of providing increased clearance or energy absorption; or more than one lift mechanism of one or more types may be implemented to provide multiple means for increased clearance or increased energy absorption. In other embodiments, the active materials may be substituted by active material based latches, wherein the active materials effect engagement and disengagement of the latches.

Advantageously, the dual chamber lifter is completely resettable. Since no motors are employed, the dual chamber lift mechanism is quiet and relatively fast. The use of active material valves and/or active material pumps provides a self-powered lifter that can be customized for the intended application due to its compact and lightweight design. The lift, reset, lower and energy dissipation functions are integrated within the device, thereby providing minimal complexity. Moreover, the stored energy can be easily dissipated allowing safe servicing and maintenance. Still further, post deployment stiffness can be tailored for the intended application or condition.

As previously described, suitable active materials include, without limitation, shape memory alloys (SMA), shape memory polymers (SMP), piezoelectric materials, electroactive polymers (EAP), ferromagnetic materials, magnetorheological fluids and elastomers (MR) and electrorheological fluids (ER).

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature, release of stored energy blocked by the SMP in its low temperature high modulus form can occur. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyorthoesters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly (ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation, e.g., a straightened shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, AgCaSe 2, ZnSe, GaP, InP, ZnS, and mixtures thereof.

Advantageously, the above noted hood lift mechanisms utilizing the active materials described herein provide relatively robust systems compared to prior art lift mechanisms. In addition to providing reversibility, the active material based actuators are relatively compact and are of significantly lower weight. Furthermore, it should be recognized by those skilled in the art that the hood lift mechanisms, as used herein, might be configured to allow for, among others, increased ease of operation and more energy to be absorbed during an impact event. It should also be recognized by those skilled in the art that the active materials, as used herein, allow input from crash sensors, pre-crash sensors and built-in logic systems, in general.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A dual chamber lifter in combination with a vehicle closure, the dual chamber lifter comprising:
   a closure; and
   a dual chamber lifter configured to selectively lift and lower the closure, the dual chamber lifter comprising a piston assembly disposed within a sealed housing, the piston assembly comprising a movable shaft and a piston head defining an upper chamber and a lower chamber; at least one pump in fluid communication with a selected one of the upper chamber, the lower chamber, and both the upper and lower chambers; a least one active material based valve in fluid communication with a selected one of the upper chamber, the lower chamber, and both the upper and lower chambers; and a controller for selectively providing an activation signal to the active material, wherein the activation signal is effective to change an attribute of the active material that opens the valve.

2. The dual chamber lifter of claim 1, wherein the at least one active material based valve comprises a shape memory alloy wire coupled to a movable valve guide, the movable valve guide in operative communication with a fluid inlet to the upper chamber to selectively open and close the fluid inlet.

3. The dual chamber lifter of claim 2, wherein the movable valve guide further comprises a bias spring configured to provide a restoring force and close the valve when the active material is deactivated.

4. The dual chamber lifter of claim 1, wherein the at least one active material based valve comprises a piezoelectric element.

5. The dual chamber lifter of claim 1, wherein the activation signal comprises a thermal activation.

6. The dual chamber lifter of claim 1, wherein the activation signal is effective to provide the active material with a shape change, a change in flexural modulus properties, or a combination thereof.

7. The dual chamber lifter of claim 1, wherein the dual chamber lifter is attached to a selected one of a vehicle frame and the closure.

8. The dual chamber lifter of claim 1, wherein the at least one pump is an active material based pump.

9. A process for selectively lifting a vehicle closure, comprising pressurizing an upper chamber and a lower chamber of a dual chamber lifter, the dual chamber lifter comprising a slidable piston defining the upper and lower chamber; and selectively activating at least one active material valve in fluid communication with a selected one of the upper chamber, the lower chamber or both the upper and lower chambers, wherein activating the at least one active material valve depressurizes the upper chamber causing the piston to rise and raise the closure.

10. The process of claim 9, further comprising pressurizing the upper chamber to lower the piston, and deactivating the active material.

11. The process of claim 9, further comprising dissipating energy stored in the upper and lower chambers, wherein the at least one active material valve is activated to depressurize the upper chamber and a second valve is opened to depressurize the lower chamber.

12. The process of claim 9, wherein the at least one active material valve comprises a shape memory alloy wire pivotably coupled to a movable valve guide, the movable valve guide in operative communication with an inlet to the upper chamber to selectively open and close the fluid inlet.

13. The process of claim 9, wherein the pump is an active material based pump.

14. The process of claim 9, wherein the second valve comprises an active material configured to open and close the second valve.

15. A computer program product for selectively lifting a vehicle closure and absorbing energy upon an impact event thereto, the computer program product comprising:
   a storage medium readable by a processing circuit and storing instructions for execution by the processing circuit for facilitating a method comprising:
      generating and storing energy in a dual chamber lifter by turning on an ignition of a vehicle, wherein storing energy comprises pressurizing an upper chamber and a lower chamber defined by a movable piston within a sealed housing; and sensing a first condition and responsively releasing the vehicle closure and the stored energy to lift the vehicle closure from a first position to a second position, wherein releasing the stored energy comprises depressurizing the upper chamber by activating an active material valve and causing a pressure differential between the upper chamber and the lower chamber, wherein the piston rises and lifts the vehicle closure.

16. The computer program product of claim 15, further comprising sensing a second condition, pressurizing the upper chamber to lower the piston and the vehicle closure, and deactivating the active material valve to close the active material valve.

17. The computer program product of claim 15, further comprising shutting off the vehicle and dissipating the stored energy without lifting the vehicle closure, wherein dissipating the stored energy comprises depressurizing the upper and lower chambers.

* * * * *